United States Patent
Knoerzer et al.

(10) Patent No.: US 7,213,385 B2
(45) Date of Patent: May 8, 2007

(54) VERTICAL STAND-UP POUCH WITH ZIPPER SEAL QUICK CHANGE MODULE

(75) Inventors: Anthony Robert Knoerzer, Plano, TX (US); Garrett William Kohl, Allen, TX (US); Steven Kenneth Tucker, Hurst, TX (US)

(73) Assignee: Frito-Lay North America, Inc., Plano, TX (US)

( * ) Notice: Subject to any disclaimer, the term of this patent is extended or adjusted under 35 U.S.C. 154(b) by 0 days.

(21) Appl. No.: 11/419,833

(22) Filed: May 23, 2006

(65) Prior Publication Data

US 2006/0196151 A1 Sep. 7, 2006

Related U.S. Application Data

(60) Division of application No. 11/028,751, filed on Jan. 4, 2005, now abandoned, which is a division of application No. 10/695,339, filed on Oct. 28, 2003, now Pat. No. 6,860,084, which is a continuation-in-part of application No. 10/135,329, filed on Apr. 30, 2002, now Pat. No. 6,679,034, which is a continuation-in-part of application No. 10/124,669, filed on Apr. 17, 2002, now Pat. No. 6,729,109, and a continuation-in-part of application No. 10/100,370, filed on Mar. 18, 2002, now Pat. No. 6,722,106.

(51) Int. Cl.
*B65B 9/20* (2006.01)
*B65B 61/18* (2006.01)

(52) U.S. Cl. ........................ 53/412; 53/451; 53/133.4; 53/551

(58) Field of Classification Search ............... 53/133.4, 53/139.2
See application file for complete search history.

(56) References Cited

U.S. PATENT DOCUMENTS 3,537,636 A 11/1970 Rochette
3,785,112 A 1/1974 Leasure et al.

(Continued)

FOREIGN PATENT DOCUMENTS

GB D. 2101909 5/2001

(Continued)

*Primary Examiner*—John Sipos
(74) *Attorney, Agent, or Firm*—Carstens & Cahoon, LLP; Colin P. Cahoon; Jeffrey G. Degenfelder

(57) ABSTRACT

A vertical stand-up pouch, or flexible package having a zipper seal mechanism incorporated therein, and method for manufacturing same, constructed with a quick change module modification to existing vertical form and fill packaging machines. The invention involves producing a vertical stand-up pouch from a single sheet of packaging film by inserting a zipper seal mechanism on a first side of the packaging film tube and creating a vertical crease along the tube prior to forming a transverse seal on the tube. The zipper seal mechanism is attached to the packaging film prior to sealing the sheet of the packaging film along its longitudinal seam forming a tube comprising, in part, a quick change module that easily installs on the base of a forming tube. Likewise, the crease is formed using fixed or stationary modifications to prior art vertical form, fill, and seal machines comprising, in part, a quick change module that easily installs on the base of a forming tube.

8 Claims, 18 Drawing Sheets

U.S. PATENT DOCUMENTS

| Patent No. | | Date | Inventor | Ref |
|---|---|---|---|---|
| 3,785,636 | A | 1/1974 | Bitting et al. | |
| 4,194,438 | A | 3/1980 | Schmachtel | |
| 4,597,103 | A | 6/1986 | Hoover | |
| 4,604,854 | A | 8/1986 | Andreas | |
| 4,790,126 | A * | 12/1988 | Boeckmann | 53/451 |
| 4,894,975 | A | 1/1990 | Ausnit | |
| 4,913,561 | A | 4/1990 | Beer | |
| 4,925,438 | A | 5/1990 | Wagner | |
| 4,986,054 | A | 1/1991 | McMahon | |
| 5,030,190 | A | 7/1991 | Woods et al. | |
| 5,046,300 | A | 9/1991 | Custer et al. | |
| 5,127,208 | A | 7/1992 | Custer et al. | |
| 5,170,608 | A | 12/1992 | Petry et al. | |
| 5,242,516 | A | 9/1993 | Custer et al. | |
| 5,322,579 | A | 6/1994 | Van Erden | |
| 5,398,486 | A | 3/1995 | Kauss et al. | |
| 5,400,565 | A | 3/1995 | Terminella et al. | |
| RE34,905 | E | 4/1995 | Ausnit | |
| 5,412,924 | A | 5/1995 | Ausnit | |
| 5,425,215 | A | 6/1995 | Ausnit | |
| 5,505,037 | A | 4/1996 | Terminella et al. | |
| 5,551,208 | A | 9/1996 | Van Erden | |
| 5,561,966 | A | 10/1996 | English | |
| 5,564,259 | A | 10/1996 | Stolmeier | |
| 5,590,783 | A | 1/1997 | Capy et al. | |
| 5,746,043 | A | 5/1998 | Terminella et al. | |
| 5,768,852 | A | 6/1998 | Terminella et al. | |
| 5,768,969 | A | 6/1998 | Dalfiume | |
| 5,788,378 | A * | 8/1998 | Thomas | 383/63 |
| 5,826,401 | A * | 10/1998 | Bois | 53/412 |
| 5,862,652 | A | 1/1999 | Schoeler | |
| 5,930,983 | A | 8/1999 | Terminella et al. | |
| 6,029,428 | A | 2/2000 | Terminella et al. | |
| 6,047,521 | A | 4/2000 | Terminella et al. | |
| 6,145,282 | A | 11/2000 | Tsuruta | |
| 6,398,412 | B2 | 6/2002 | Wedi et al. | |
| 6,588,177 | B1 * | 7/2003 | Melchoir | 53/412 |
| 6,615,567 | B2 | 9/2003 | Kuhn et al. | |
| 2003/0009989 | A1 | 1/2003 | Knoerzer et al. | |

FOREIGN PATENT DOCUMENTS

| | | |
|---|---|---|
| JP | 2191159 | 7/1990 |
| WO | PCT/FR93/00303 | 10/1993 |

* cited by examiner

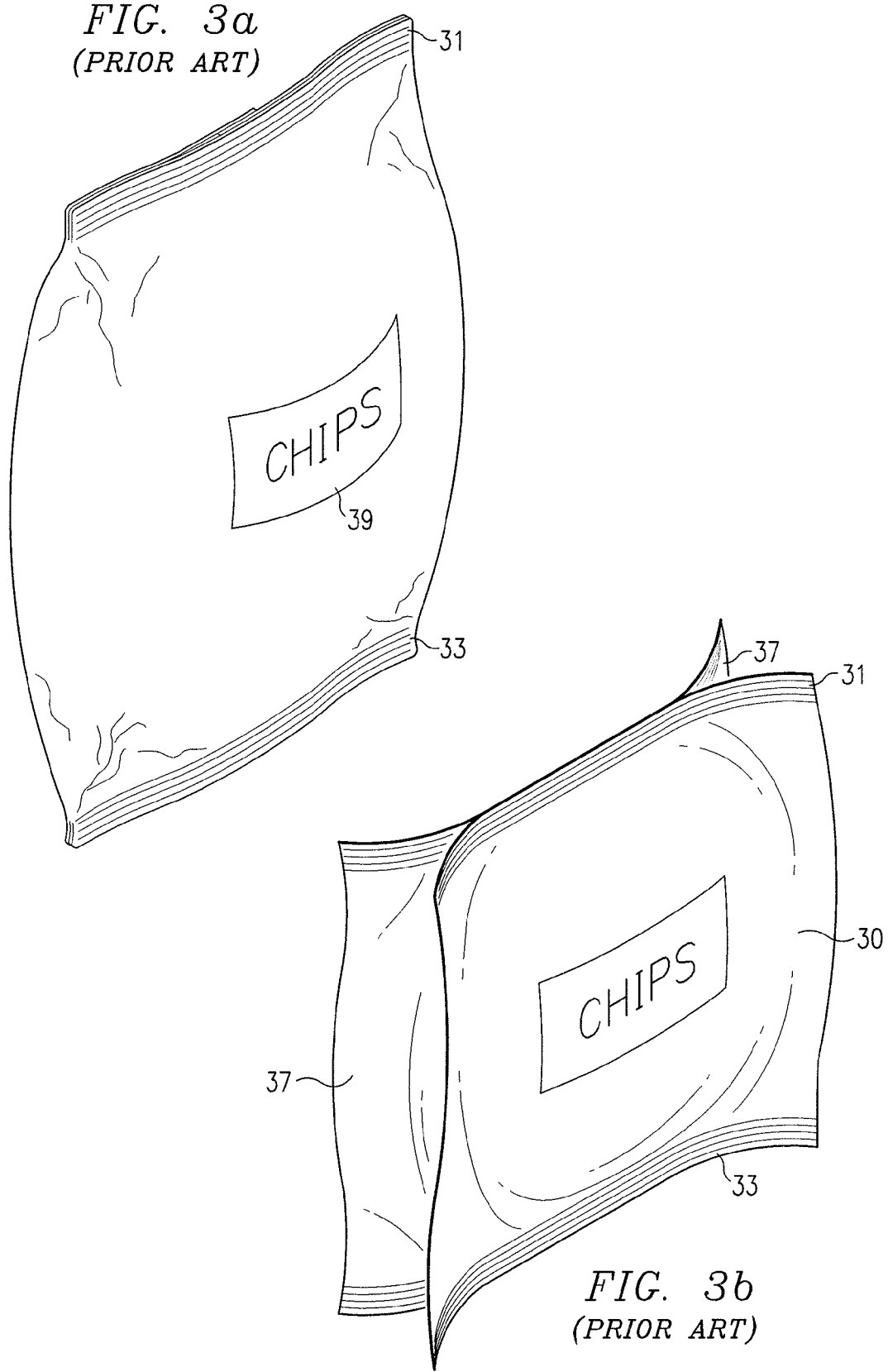

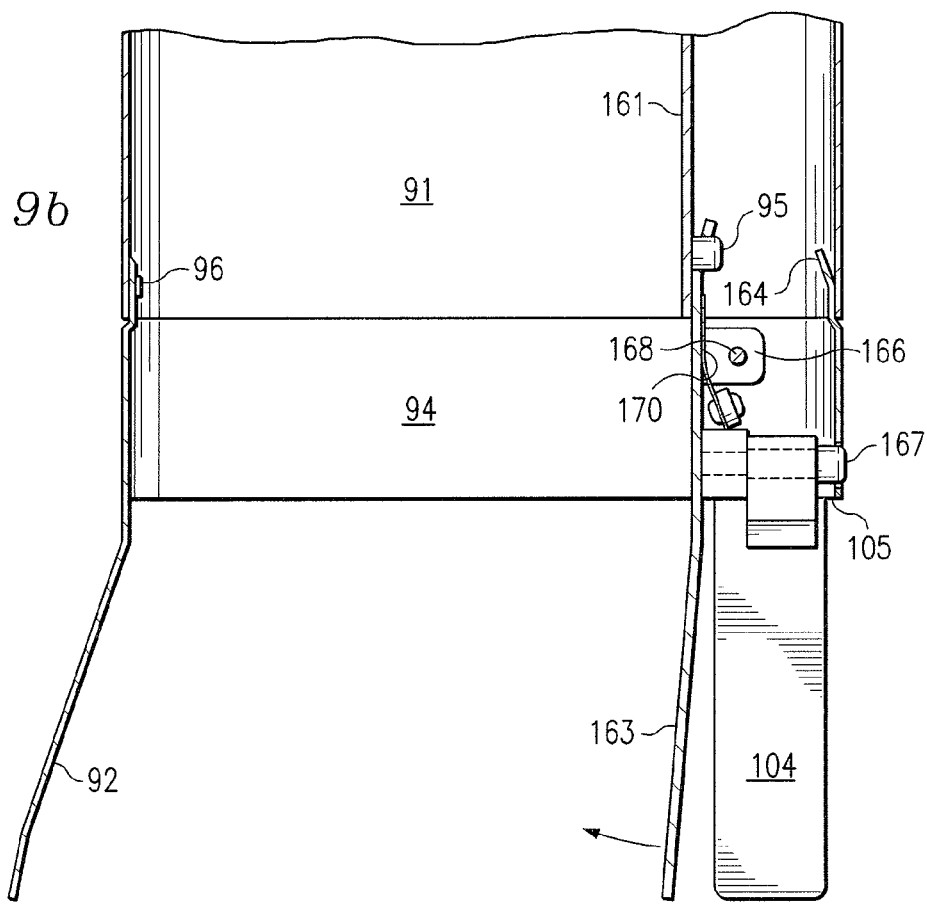
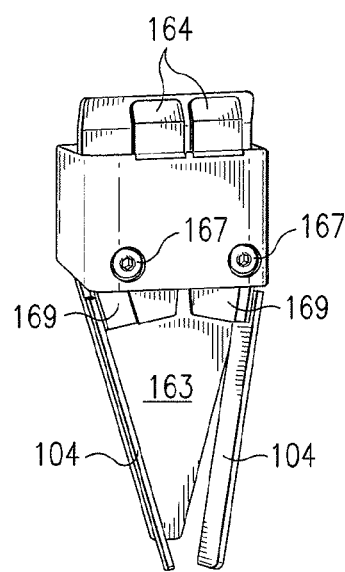

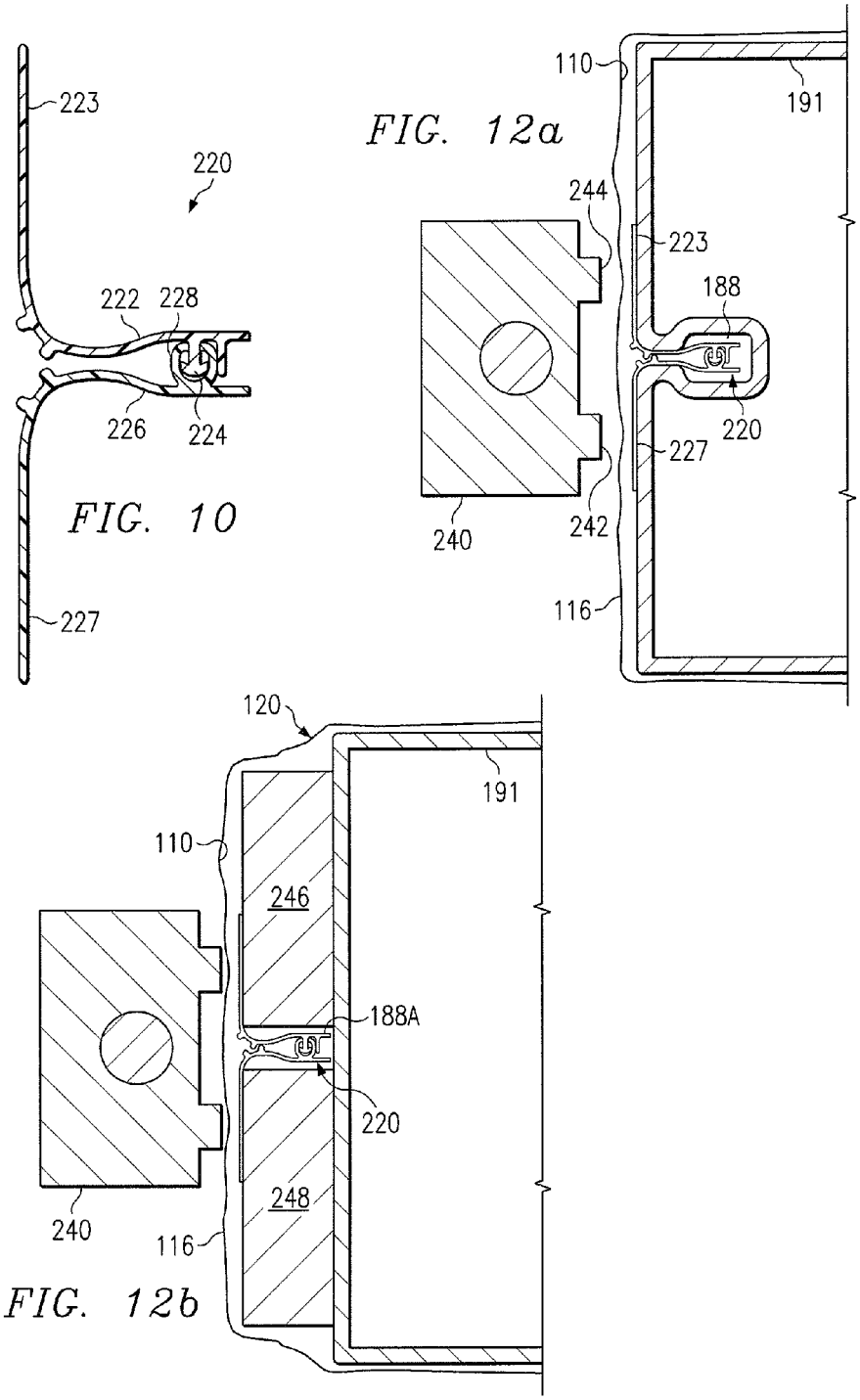

VERTICAL STAND-UP POUCH WITH ZIPPER SEAL QUICK CHANGE MODULE

CROSS-REFERENCE TO RELATED APPLICATIONS

This application is a divisional of U.S. application Ser. No. 11/028,751, filed Jan. 4, 2005, now abandoned which is a divisional of U.S. application Ser. No. 10/695,339, filed Oct. 28, 2003 (now U.S. Pat. No. 6,860,084), which is a continuation-in-part of co-pending U.S. patent application Ser. No. 10/135,329, filed on Apr. 30, 2002, (now U.S. Pat. 6,679,034), which, in turn, is a continuation-in-part of co-pending U.S. application Ser. No. 10/124,669 filed on Apr. 17, 2002, (now U.S. Pat. 6,729,109), and U.S. application No. 10/100,370 filed on Mar. 18, 2002, (now U.S. Pat. 6,722,106).

TECHNICAL FIELD

The present invention relates to a vertical stand-up pouch having vertical gussets and an integrated zipper seal constructed using a modified vertical form, fill, and seal packaging machine, and the method for making same, that provides for a single piece construction of a stand-up bag suitable for retail snack food distribution. The invention allows for use of existing film converter and packaging technology to produce a stand-up package having an integrated zipper seal with minimal increased costs and minimal modifications.

DESCRIPTION OF THE RELATED ART

Vertical form, fill, and seal packaging machines are commonly used in the snack food industry for forming, filling, and sealing bags of chips and other like products. Such packaging machines take a packaging film from a sheet roll and forms the film into a vertical tube around a product delivery cylinder. The vertical tube is vertically sealed along its length to form a back seal. The machine applies a pair of heat-sealing jaws or facings against the tube to form a horizontal transverse seal. This transverse seal acts as the top seal on the bag below and the bottom seal on the package being filled and formed above. The product to be packaged, such as potato chips, is dropped through the product delivery cylinder and formed tube and is held within the tube above the bottom transverse seal. After the package has been filled, the film tube is pushed downward to draw out another package length. A transverse seal is formed above the product, thus sealing it within the film tube and forming a package of product. The package below said transverse seal is separated from the rest of the film tube by cutting horizontally across the sealed area.

The packaging film used in such process is typically a composite polymer material produced by a film converter. For example, one prior art composite film used for packaging potato chips and like products is illustrated in FIG. 1, which is a schematic of a cross-section of the film illustrating each individual substantive layer. FIG. 1 shows an inside, or product side, layer 16 which typically comprises metalized oriented polypropylene ("OPP") or metalized polyethylene terephtalate ("PET"). This is followed by a laminate layer 14, typically a polyethylene extrusion, and an ink or graphics layer 12. The ink layer 12 is typically used for the presentation of graphics that can be viewed through a transparent outside layer 10, which layer 10 is typically OPP or PET.

The prior art film composition shown in FIG. 1 is ideally suited for use on vertical form and fill machines for the packaging of food products. The metalized inside layer 16, which is usually metalized with a thin layer of aluminum, provides excellent barrier properties. The use of OPP or PET for the outside layer 10 and the inside layer 16 further makes it possible to heat seal any surface of the film to any other surface in forming either the transverse seals or back seal of a package. Alternatively, a material can be used on the outside layer 12 that will not seal on itself, such as a paper layer or a non-sealing polymer layer, so that only the inside layer 16 is used as a sealing surface.

Typical back seals formed using the film composition shown in FIG. 1 are illustrated in FIGS. 2a and 2b. FIG. 2a is a schematic of a "lap seal" embodiment of a back seal being formed on a tube of film, which can be used when the outside and inside layers are sealable together. FIG. 2b illustrates a "fin seal" embodiment of a back seal being formed on a tube of film, which can be used when the outside layer is not suitable as a sealing surface.

With reference to FIG. 2a, a portion of the inside metalized layer 26 is mated with a portion of the outside layer 20 in the area indicated by the arrows to form a lap seal. The seal in this area is accomplished by applying heat and pressure to the film in such area. The lap seal design shown in FIG. 2a insures that the product to be placed inside the formed package will be protected from the ink layer by the metalized inside layer 26.

The fin seal variation shown in FIG. 2b also provides that the product to be placed in the formed package will be protected from the ink layer by the metalized inside layer 26. Again, the outside layer 20 does not contact any product. In the embodiment shown in FIG. 2b, however, the inside layer 26 is folded over and then sealed on itself in the area indicated by the arrows. Again, this seal is accomplished by the application of heat and pressure to the film in the area illustrated.

Regardless of whether a lap seal or fin seal is used for constructing a standard package using a vertical form, fill, and seal packaging machine, the end result is a package as shown in FIG. 3a with horizontally oriented top and bottom transverse seals 31, 33. Such package is referred to in the art as a "vertical flex bag" or "pillow pouch," and is commonly used for packaging snack foods such as potato chips, tortilla chips, and other various sheeted and extruded products. The back seal discussed with reference to FIGS. 2a and 2b runs vertically along the bag and is typically centered on the back of the package shown in FIG. 3a, thus not visible in FIG. 3a. Because of the narrow, single edge base on the package shown in FIG. 3a formed by the bottom transverse seal 33, such prior art packages are not particularly stable when standing on one end. This shortcoming has been addressed in the packaging industry by the development of a horizontal stand-up pouch such as the embodiment illustrated in FIGS. 4a, 4b, and 4c. As can be seen by reference to said Figures, such horizontal stand-up pouch has a relatively broad and flat base 47 having two contact edges. This allows for the pouch to rest on this base 47 in a vertical presentation. Manufacture of such horizontal stand-up pouches, however, does not involve the use of standard vertical form, fill, and seal machines but, rather, involves an expensive and relatively slow 3-piece construction using a pouch form, fill, and seal machine.

Referring to FIGS. 4b and 4c, the horizontal stand-up pouch of the prior art is constructed of three separate pieces of film that are mated together, namely, a front sheet 41, a rear sheet 43, and a base sheet 45. The front sheet 41 and rear sheet 43 are sealed against each other around their edges, typically by heat sealing. The base sheet 45 is, however, first secured along its outer edges to the outer edges of the bottom of the front sheet 41 and rear sheet 43, as is best illustrated in FIG. 4c. Likewise, the mating of the base sheet 45 to the front sheet 41 and the rear sheet 43 is also accomplished typically by a heat seal. The requirement that such horizontal stand-up pouch be constructed of three pieces results in a package that is significantly more expensive to construct than a standard form, fill, and seal vertical flex bag.

Further disadvantages of using horizontal stand-up pouches include the initial capital expense of the horizontal stand-up pouch machines, the additional gas flush volume required during packaging as compared to a vertical flex bag, increased down time to change the bag size, slower bag forming speed, and a decreased bag size range. For example, a Polaris model vertical form, fill, and seal machine manufactured by Klick Lock Woodman of Georgia, USA, with a volume capacity of 60–100 bags per minute costs in the range of $75,000.00 per machine. A typical horizontal stand-up pouch manufacturing machine manufactured by Roberts Packaging of Battle Creek, Mich., with a bag capacity of 40–60 bags per minute typically costs $500,000.00. The film cost for a standard vertical form, fill, and seal package is approximately $0.04 per bag with a comparable horizontal stand-up pouch costing roughly twice as much. Horizontal stand-up pouches further require more than twice the oxygen or nitrogen gas flush. Changing the bag size on a horizontal stand-up pouch further takes in excess of two hours, typically, while a vertical form and fill machine bag size can be changed in a matter of minutes. Also, the typical bag size range on a horizontal stand-up pouch machine is from 4 oz. to 10 oz., while a vertical form and fill machine can typically make bags in the size range of 1 oz. to 24 oz.

One current advantage of a horizontal stand-up pouch machine over a vertical form, fill, and seal machine, however, is the relatively simple additional step of adding a zipper seal at the top of the bag for reclosing of the bag. Vertical form, fill, and seal machines typically require substantial modification and/or the use of zipper seals pre-mounted on the film oriented horizontally to the seal facings used to seal the horizontal transverse seals.

An alternative approach taken in the prior art to producing a bag with more of a stand-up presentation is the construction of a flat bottom bag such as illustrated in FIG. 3b. Such bag is constructed in a method very similar to that described above with regard to prior art pillow pouches. However, in order to form the vertical gussets 37 on either side of the bag, the vertical form, fill, and seal machine must be substantially modified by the addition of two movable devices on opposite sides of the sealing carriage that moves in and out to make contact with the packaging film tube in order to form the tuck that becomes the gussets 37 shown in FIG. 3b. Specifically, when a tube is pushed down to form the next bag, two triangular shaped devices are moved horizontally towards the packaging film tube until two vertical tucks are formed on the packaging film tube above the transverse seals by virtue of contact with these moving triangular shaped devices. While the two triangular shaped devices are thus in contact with the packaging tube, the bottom transverse seal 33 is formed. The package is constructed with an outer layer 30 that is non-sealable, such as paper. This causes the formation of a V-shaped gusset 37 along each vertical edge of the package when the transverse seals 31, 33 are formed. While the triangular shaped devices are still in contact with the tube of packaging material, the product is dropped through the forming tube into the tube of packaging film that is sealed at one end by virtue of the lower transverse seal 33. The triangular shaped devices are then removed from contact with the tube of packaging film and the film is pushed down for the formation of the next package. The process is repeated such that the lower transverse seal 33 of the package above and upper transverse seal 31 of the package below are then formed. This transverse seal is then cut, thereby releasing a formed and filled package from the machine having the distinctive vertical gussets 37 shown in FIG. 3b.

The prior art method described above forms a package with a relatively broad base due to the V-shaped vertical gussets 37. Consequently, it is commonly referred to in the art as a flat bottom bag. Such flat bottom bag is advantageous over the previously described horizontal stand-up pouch in that it is formed on a vertical form, fill, and seal machine, albeit with major modifications. However, the prior art method of making a flat bottom bag has a number of significant drawbacks. For example, the capital expense for modifying the vertical form, fill, and seal machine to include the moving triangular-shaped devices is approximately $30,000.00 per machine. The changeover time to convert a vertical form, fill, and seal machine from a standard pillow pouch configuration to a stand-up bag configuration can be substantial, and generally in the neighborhood of one-quarter man hours. The addition of all of the moving parts required for the triangular-shaped device to move in and out of position during each package formation cycle also adds complexity to the vertical form, fill, and seal machine, inevitably resulting in maintenance issues. Importantly, the vertical form, fill, and seal machine modified to include the moving triangular-shaped devices is significantly slower than a vertical form, fill, and seal machine without such devices because of these moving components that form the vertical gussets. For example, in the formation of a six inch by nine inch bag, the maximum run speed for a modified vertical form, fill, and seal machine using the triangular-shaped moving devices is in the range of 15 to 20 bags per minute. A standard vertical form, fill, and seal machine without such modification can construct a similarly sized pillow pouch at the rate of approximately 40 bags per minute.

Consequently, a need exists for a method to form a stand-up pouch, similar in appearance and functionality to the prior art horizontal stand-up pouches or prior art flat bottom bags, using vertical form, fill, and seal machine technology and a single sheet of packaging film. Moreover, a need also exists for a method of incorporating a zipper seal into such a formed stand-up pouch using the vertical form, fill, and seal machine technology. These methods should allow for reduced film cost per bag as compared to horizontal stand-up pouches, ease in size change, and little capital outlay, all while maintaining bag forming speeds typical of vertical form, fill, and seal machine pillow pouch production. Such methods should ideally produce a vertical stand-up pouch or a flat bottom bag having a zipper seal incorporated therein, and constructed of materials commonly used to form standard vertical flex bags without adding complexity or moving parts to a standard vertical form, fill, and seal machine.

SUMMARY OF THE INVENTION

The proposed invention involves producing a vertical stand-up pouch or package having a zipper seal mechanism incorporated therein constructed of a single sheet of material using a vertical form, fill, and seal machine. The vertical form, fill, and seal machine may be specifically constructed to produce such a package or comprise a standard vertical form, fill, and seal machine which is slightly modified with a quick change module comprising a tension insertion mechanism in line with a longitudinal channel formed adjacent to the form/fill tube and a pair of forming plates located below the forming/filling tube and at least one stationary tucker mechanism mounted to the frame of the machine. The tucker mechanism is positioned between a pair of forming plates, thereby creating a vertical tuck along the length of the package while it is being formed.

Conversely, a length of zipper seal mechanism may be inserted and attached along a longitudinal length of the package on an opposing side from the side into which the vertical tuck is formed. The zipper seal mechanism is typically comprised of two interlocking and opposing members, each of which include a profile portion, which interlocks with a complementary profile portion on the other member, and a tab portion extending away from the profile portion.

The zipper seal mechanism is typically supplied from a supply spool, which feeds the zipper seal mechanism to a longitudinal channel formed in or adjacent to the forming/filling tube of the vertical form, fill, and seal machine. The length of zipper seal mechanism may comprise either a continuous length of the zipper seal mechanism or separate segment lengths of zipper seal mechanism interspersed along an interconnecting webbing.

The length of zipper seal mechanism is attached to the packaging material while the material is being formed into a tubular shape. A reciprocating heat sealing mechanism attaches at least a portion of the tab portions of the each of the interlocked members comprising the zipper seal mechanism to an interior surface of the tubular shaped material prior to a longitudinal heat sealing mechanism applying a vertical back seal to the tubular shaped material.

A tension insertion mechanism located at the bottom of the forming/filling tube blouses the packaging film pushing the zipper seal mechanism into the interior of the package thereby creating a headspace between the film and the interlocked profiled portions of the zipper seal mechanism. The creation of the headspace improves the sealing qualities of the traverse sea subsequently applied to the package.

The graphics on the package are oriented 90° from a standard presentation when using the invention to make a vertical stand-up pouch. The transverse seals on such formed package are therefore oriented vertically when the bag is placed on display. Consequently, the vertical tuck is situated at the resulting package's base while the zipper seal mechanism is situated on the interior of the top of the resulting package.

The method disclosed and the package formed as a consequence is a substantial improvement over prior art horizontal stand-up pouches or packages. The method works on existing vertical form, fill, and seal machines requiring very little modification. There are no substantial moving parts or jaw carriage modifications involved. The vertical form, fill, and seal machines can be easily converted back to a pillow pouch configuration with a simple module change. The same metalized or clear laminations used as materials in pillow pouches can also be used with the invention therefore saving in per bag cost.

The invention may also include a quick change module comprising the forming plates and, when making vertical stand-up pouches, a tension insertion mechanism on the opposite side of the forming tube from the crease forming plates. The module easily attaches to the bottom of the forming tube, thereby making conversion back to a standard pillow bag manufacture simple and quick.

The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 3a is a perspective view of a prior art vertical flex bag;

FIG. 3b is a perspective view of a prior art flat bottom bag;

FIG. 9b is a sectional view of one embodiment of the quick change module attached to the bottom of a forming tube, said sectional view taken along lines 9b—9b of FIG. 9a; and FIG. 9c is a side view in elevation of one embodiment of the quick change module of the present invention.

FIG. 10 is a cross-sectional view of one embodiment of interlocking zipper elements comprising a zipper seal mechanism utilized in the form, fill, and seal packaging machine of the present invention;

FIG. 12a is a simplified sectional view of a first embodiment of a zipper heat seal bar, said sectional view taken along lines 12—12 of FIG. 11;

FIG. 12b is a simplified sectional view of a second embodiment of a zipper heat seal bar, said sectional view taken along lines 12—12 of FIG. 11;

FIG. 13b is a sectional view of one embodiment of the zipper seal insert quick change module attached to the bottom of a forming tube, said sectional view taken along lines 13b—13b of FIG. 13a;

FIG. 13c is a reverse perspective view of a transition tension mechanism in the embodiment of the zipper seal insert quick change module of the present invention shown in FIG. 13a.

Figure 1:
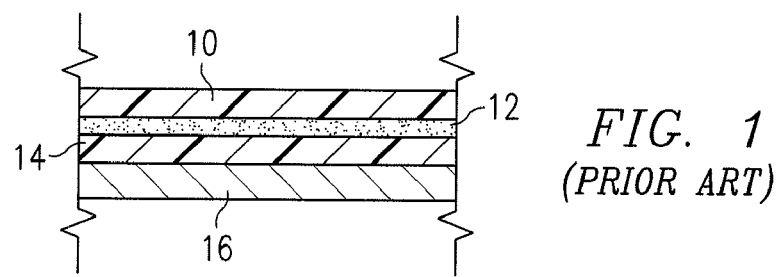
FIG. 1 is a schematic cross-section views of prior art packaging films.
Figure 2A:
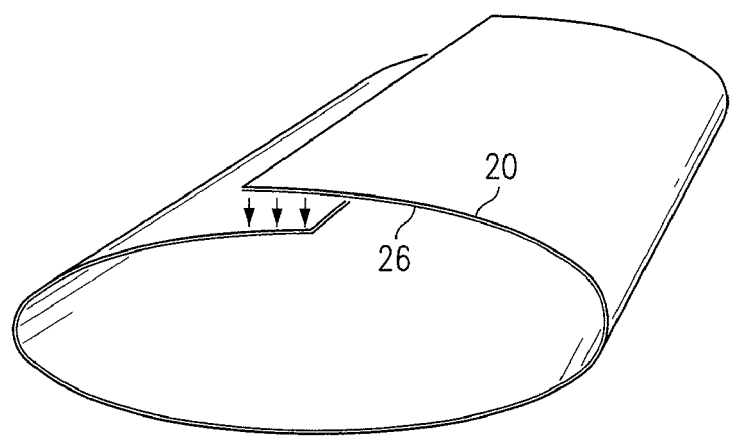
FIG. 2a is a schematic cross-section view of a tube of packaging film illustrating the formation of a prior art lap seal.
Figure 2B:
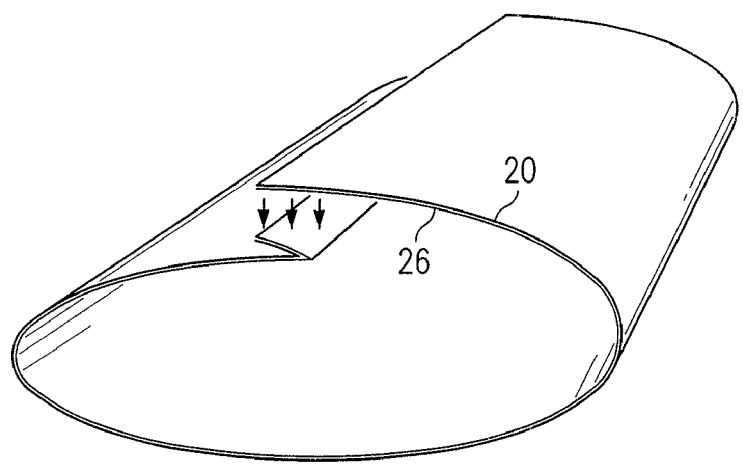
FIG. 2b is a schematic cross-section of a tube of packaging film illustrating the formation of a prior art fin seal.
Figure 4A:
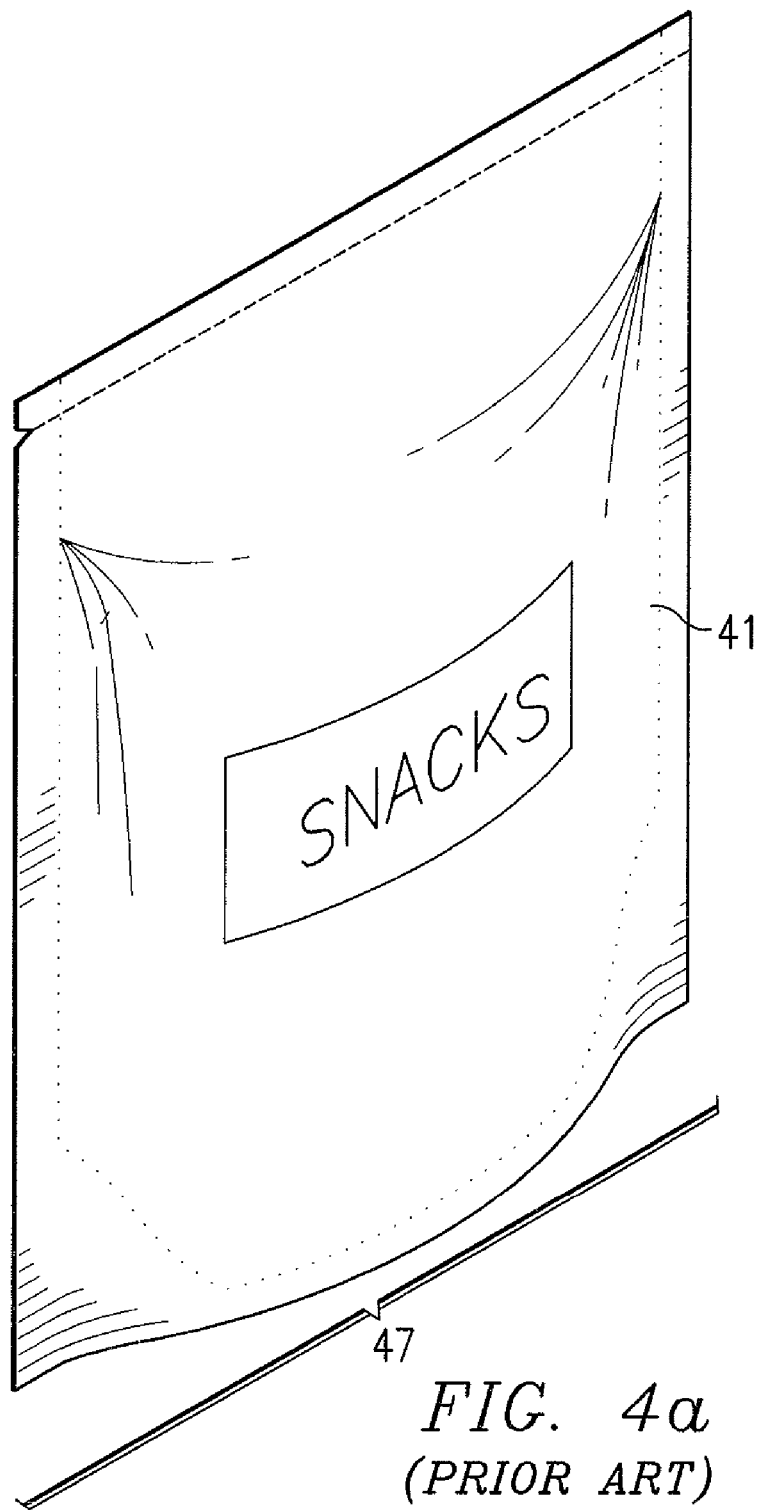
FIGS. 4a, 4b, and 4c are perspective views in elevation of a prior art horizontal stand-up pouch.
Figure 4B:
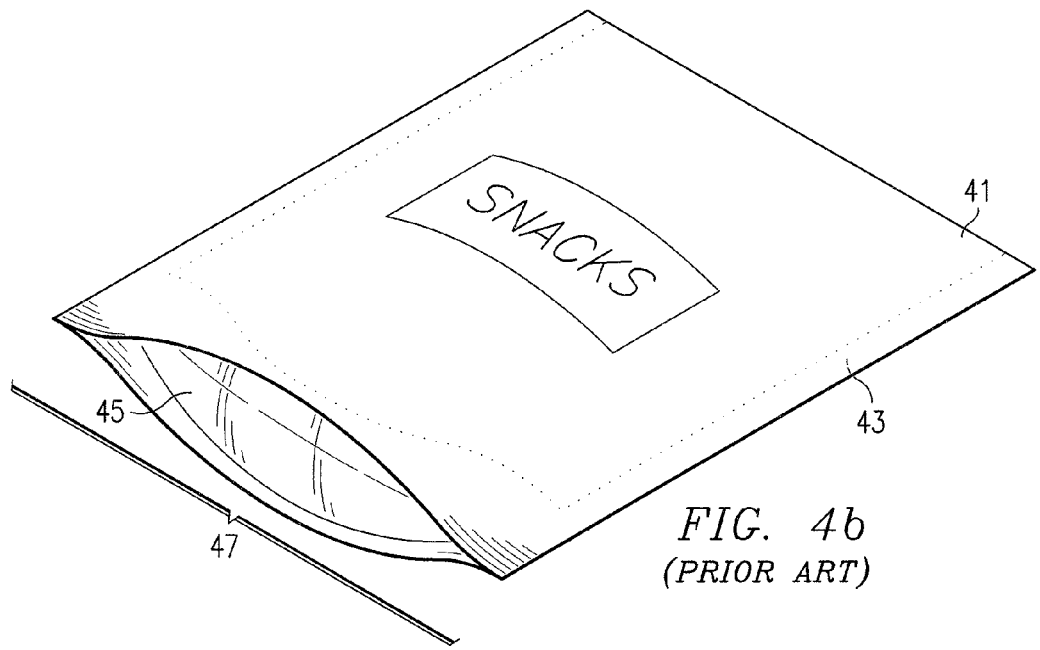
Figure 4C:
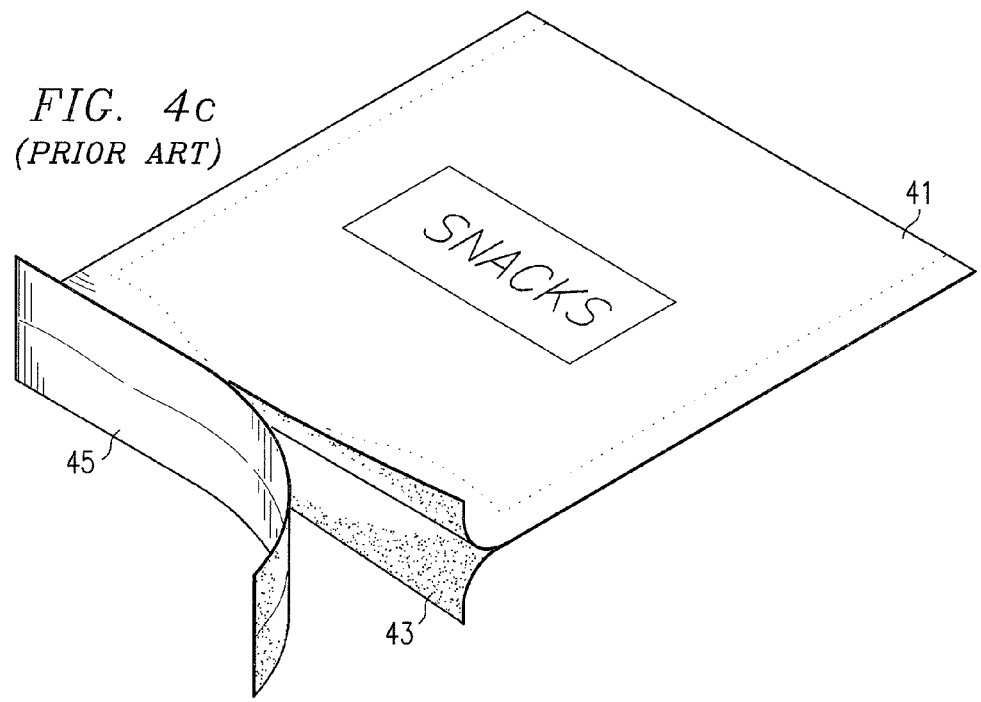

Where used in the various figures of the drawing, the same numerals designate the same or similar parts. Furthermore, when the terms "top," "bottom," "first, " "second," "upper," "lower," "height," "width," "length," "end," "side," "horizontal," "vertical," and similar terms are used herein, it should be understood that these terms have reference only to the structure shown in the drawing and are utilized only to facilitate describing the invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

A. Vertical Stand-Up Pouch

Figure 5A:
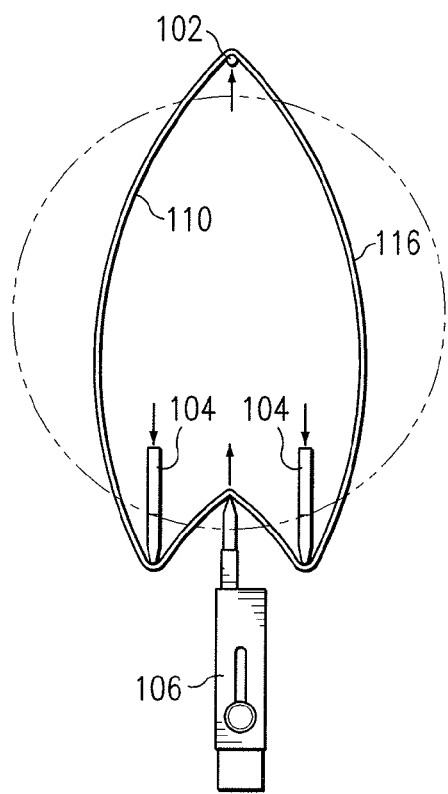
FIG. 5a is a schematic cross-section of a tube of packaging film formed by the vertical stand-up pouch embodiment of the present invention methods.
Figure 6A:
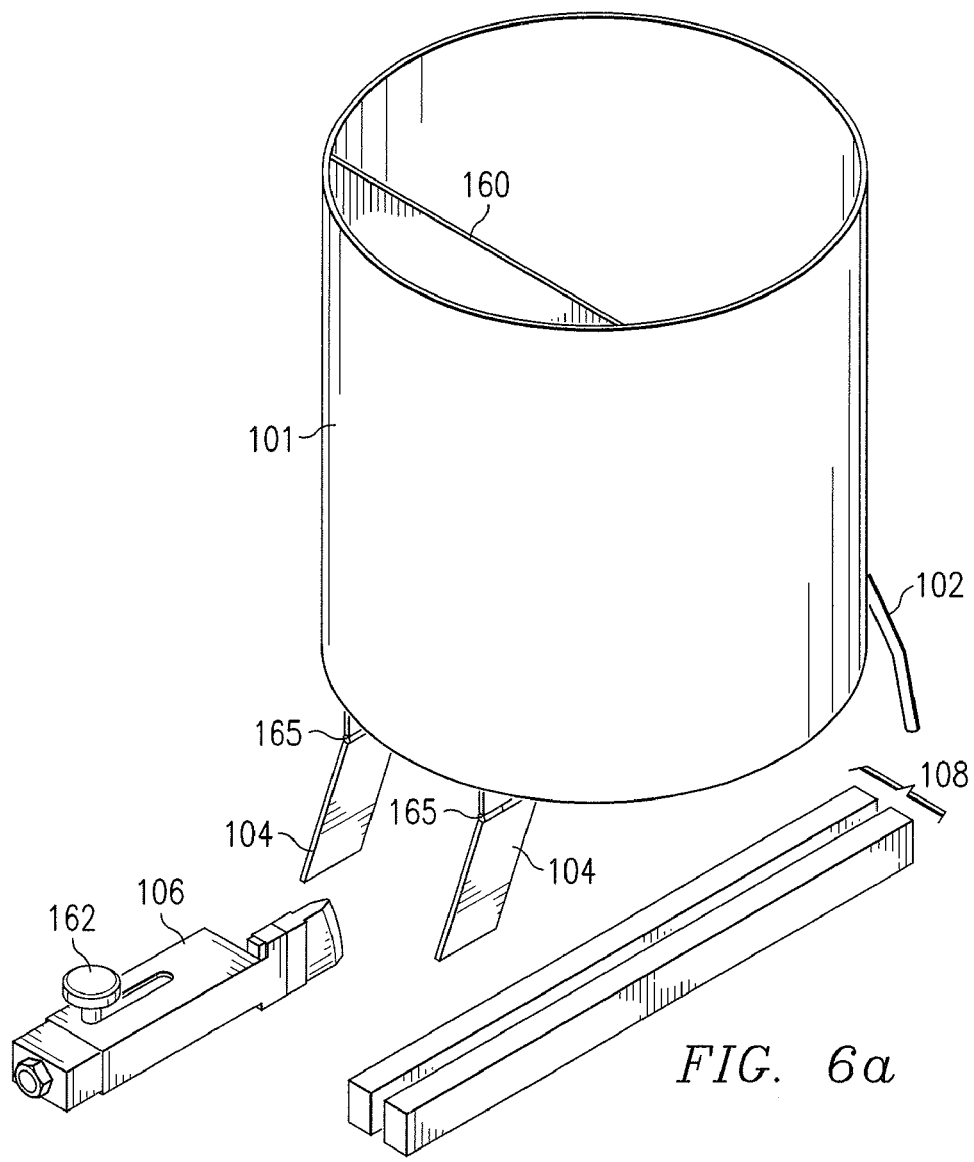
FIG. 6a is a perspective view of the tucker mechanism, forming plates, and tension bar in elevation of the vertical stand-up pouch embodiment of the present invention in relation to a forming tube and sealing jaws of a vertical form, fill, and seal machine.

FIGS. 5a and 6a illustrate the basic components used with the method of the proposed invention as it relates to the manufacture of a vertical stand-up pouch. The same reference numbers are used to identify the same corresponding elements throughout all drawings unless otherwise noted.

FIG. 5a is a schematic cross-section of a tube of packaging material (film) formed by the present invention method. The tube of packaging film shown in FIG. 5a is illustrated as a cross-sectional area immediately below the forming tube 101 of FIG. 6a. The tube of packaging film comprises an outer layer 116 and an inner layer 110, and can comprise material typically used in the field of art for making a standard vertical flex bag, such as discussed in relation to FIG. 1. The tube in FIG. 5a has been formed by sealing one sheet of film with a vertical back seal, as previously described with regard to discussions of prior art vertical form and fill machine methods.

FIG. 6a shows a forming tube 101 typical in most respects to those used with prior art vertical form, fill, and seal machines. This forming tube 101 can be a cylinder, have a rectangular cross section, or any number of shapes, but is preferably cylindrical as illustrated. The film illustrated in FIG. 5a is initially formed around the forming tube 101 of FIG. 6a. This forming tube 101 is shown in elevation but would normally be integrally attached to the vertical form, fill, and seal machine. Also shown in FIG. 6a are a pair of prior art sealing jaws 108 likewise illustrated in elevation. Not shown in FIG. 6a is the sealing jaw carriage on which such sealing jaws 108 would be mounted below the forming tube 101.

As previously described, the practice in the prior art in the manufacture of a vertical flex bag involves feeding a continuous packaging film directed around the forming tube 101. A back seal is formed on a single layer of film in order to create a tube of film around the forming tube 101. The seal jaws 108 close on the thus formed tube of packaging film, thereby forming a bottom transverse seal. Product is then dropped through the forming tube 101 into the tube of packaging film. The tube is then driven downward by friction against rotating belts (not shown), and the seal jaws 108 are used to form another transverse seal above the level of the product found inside the tube. This seal is subsequently cut horizontally such that a top transverse seal is formed at the top of the filled bag below and a bottom transverse seal is formed on the tube of packaging film above. The packaging film during the prior art operation described above is oriented perpendicular to the longitudinal translation of the film so as to be readable by an operator of the machine as the film travels down the forming tube 101. This orientation provides graphics 39 on the formed prior art bag that are readable by a consumer when the formed bag is placed on a retail display shelf while resting on its bottom transverse seal 33 as seen in FIG. 3a. As will be described in further detail below, the orientation of the graphics on the film packaging for Applicants' invention is 90° off of the prior art orientation, such that the graphics appear sideways as viewed by the operator of the vertical form and fill machine as the film is pulled down the forming tube 101 of FIG. 6a. In other words, the graphics on the packaging film are oriented perpendicular to the direction of film travel.

The invention adds three basic components to a prior art vertical form, fill, and seal machine. Two forming plates 104 and one tension bar 102 are used to hold the packaging film tube in tension from inside the tube, as indicated by the arrows illustrated on FIG. 5a. As shown in FIG. 6a, the forming plates 104 and tension bar 102 can be attached directly to the forming tube 101 or, alternatively, to any supporting structure on the vertical form, fill, and seal machine, as long as the forming plates 104 and tension bar 102 are positioned within the tube of packaging material, below the bottom of the forming tube 101, and above the heat sealing jaws 108.

Tension is applied on the outside of the film and in the opposite direction of the tension provided by the forming plates 104 by a fixed or stationary tucker mechanism 106, alternatively referred to herein as a tucker bar 106, positioned between said forming plates 104. The tucker bar 106 is preferably attached to the sealing carriage for the vertical form, fill, and seal machine and is adjustable along all three axes (in/out, up/down, and front/back). Alternatively, the tucker bar 106 can be attached to the frame of the vertical form, fill, and seal machine or any other point that can supports its function outside the film tube. These adjustments in all three axes allow for the tucker bar 106 to be easily moved out of the way to convert the vertical form and fill machine back to standard operation and is accomplished, in the embodiment shown in FIG. 6a, by a tension screw 162 that can lock the tucker bar 106 in place when tightened. While the tucker bar 106 is adjustable, unlike in the prior art, it is fixed or stationary during operation. Therefore, the present invention is a substantial improvement over the art in that there are no moving parts to the tucker mechanism during bag making. This improvement is what Applicants intend to describe when referring to the tucker bar 106 as "stationary" or "fixed." Because of this stationary tucker bar feature, bag making speeds can match typical pillow pouch manufacturing rates.

When moved forward into position (i.e., toward the forming plates 104), the tucker bar 106 provides a crease or fold in the tube of the packaging film between the two forming plates 104. This crease is formed prior to formation of the transverse seal by the seal jaws 108. Consequently, once the transverse seal is formed, the crease becomes an integral feature of one side of the package. The vertical form and fill machine thereafter operates basically as previously described in the prior art, with the sealing jaws 108 forming a lower transverse seal, product being introduced through the forming tube 101 into the sealed tube of packaging film (which now has a crease on one side), and the upper transverse seal being formed, thereby completing the package. The major differences between a prior art package and Applicants' package, however, are that a crease is formed on one side (which later becomes the bottom of the formed package) using the fixed mechanism described and that the graphics on the packaging film used by the invention are oriented such that when the formed package is stood onto the end with the crease, the graphics are readable by a consumer.

Figure 7A:
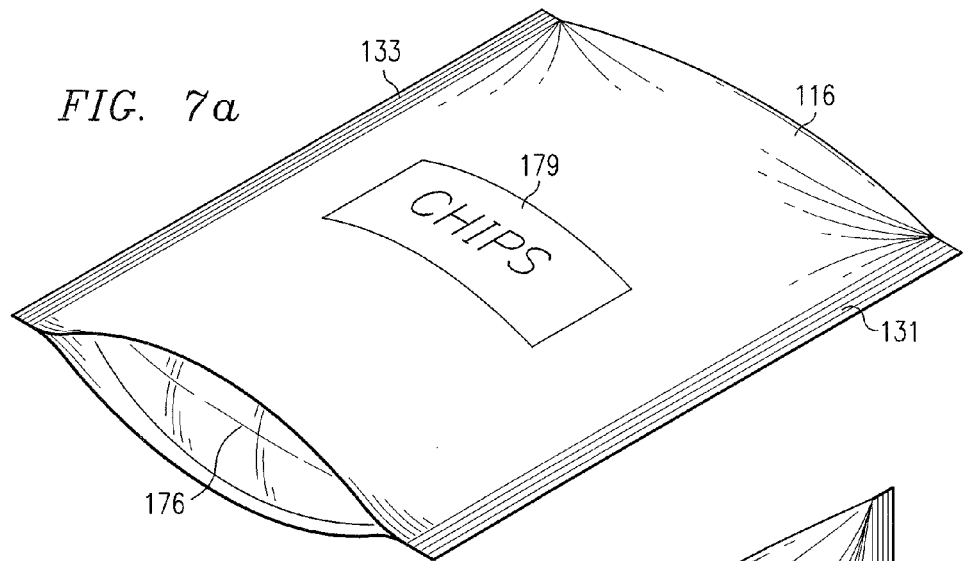
FIGS. 7a and 7b are perspective views of the vertical stand-up pouch of the present invention.
Figure 7B:
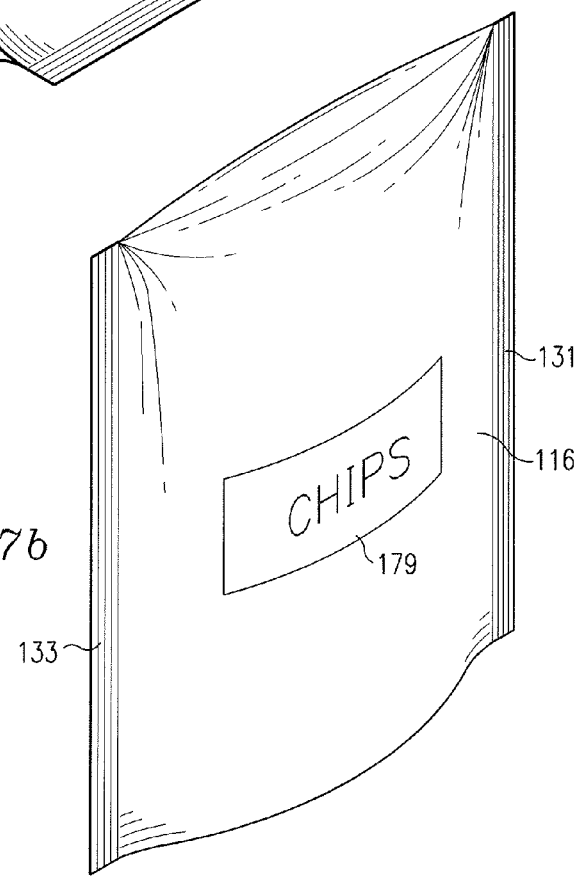

An example of the formed package of the instant invention is shown in FIGS. 7a and 7b, which show the outside layer of the packaging film 116 with the graphics 179 oriented as previously described. As can be seen from FIGS. 7a and 7b, the construction of the invention's vertical stand-up pouch shares characteristics with the prior art vertical flex bags shown in FIG. 3a. However, the transverse seals 131, 133 of the vertical stand-up bag of the invention are oriented vertically once the bag stands up on one end, as shown in FIG. 7b. FIG. 7a shows the crease 176 that was formed by the tucker bar 106 and forming plates 104 discussed in relation to FIGS. 5a and 6a.

Returning to FIG. 6a, another optional feature that can be incorporated into this invention is the use of a diversion plate 160 within the forming tube 101. This diversion plate 160, in the embodiment illustrated, is a flat plate welded vertically inside the forming tube 101 that extends from the bottom of the forming tube 101 to some distance above (for example, at least two or three inches) the bottom of the forming tube 101, where it then is sealed against the inside of the forming tube 101.

The diversion plate 160 in a preferred embodiment accomplishes two functions. First, the diversion plate 160 keeps product that is dropped down the forming tube 101 away from the area where the crease is being formed on the tube of packaging film. Second, the diversion plate 160, can be used as a channel for a gas or nitrogen flush. In such instance, the diversion plate 160 at some point above the bottom of the forming tube 101 seals at the top of the plate 160 against the forming tube 101. Below such seal (not shown) an orifice can be drilled into the forming tube 101 in order to provide gas communication between an exterior gas (for example, nitrogen or oxygen) source and the cavity formed between the diversion plate 160 and the interior of the forming tube 101. The diversion plate 160 as shown in FIG. 6a is a flat plate, but it should be understood that it can be of any variety of shapes, for example, having a curved surface, provided that it accomplishes the functionality of diverting the product away from the area where the tuck is formed on the tube of film.

By using the diversion plate 160 as a channel for the gas flush, the present invention eliminates the need for a separate gas tube to be placed inside the forming tube 101 that normally accomplishes the same function in the prior art. The added benefit of providing a relatively large volume channel formed by the diversion plate 160 and the interior of the forming tube 101 is that a relatively large volume of flushing gas can be introduced into a filled and partially formed package at a significantly lower gas velocity compared to prior art gas tubes. This allows for the filling of packages using this embodiment of the present invention that may contain low weight product that might otherwise be blown back into the forming tube by prior art flushing tubes.

Figure 8:
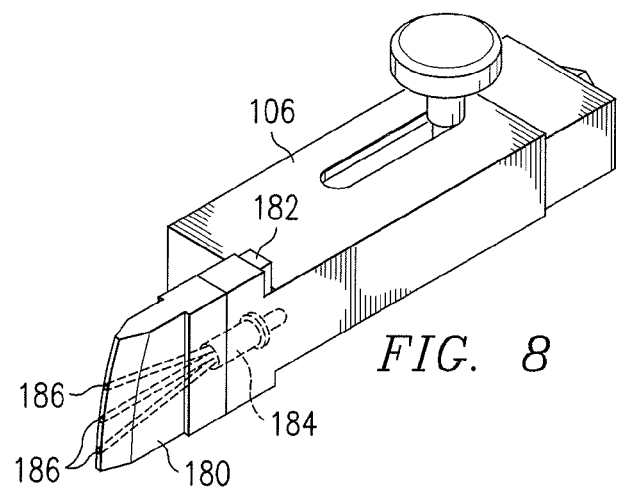
FIG. 8 is a perspective view of one embodiment of the tucker mechanism of the present invention.

FIG. 8 illustrates a preferred embodiment of the tucker bar 106. This embodiment of the tucker bar 106 comprises a head 180 attached to a support 182. Drilled within the support 182 and head 180 is a gas channel 184 shown in phantom on FIG. 8. This gas channel 184 provides a gas communication from an exterior gas source (not shown) through the support 182, through the head 180, and out three orifices 186. The gas channel 184 allows for a metered burst of pressurized gas (typically air) that helps keep the tuck illustrated in FIG. 5a taut throughout the forming and sealing operation without the necessity of moving the tucker bar in and out during bag formation. It should be noted that during operation (bag making) the tucker bar 106 is always stationary. It should further be noted that the head 180 necessarily cannot extend along the entire length of the crease formed by the tucker bar 106 and forming plates 104. Further, it should be understood that when the sealing jaws 108 close onto the tube of film, the lateral dimensions of the tube of film change. All of these facts are compensated for by the use of the pressurized air bursting from the orifices 186. The pressurized air keeps an even amount of pressure on the tuck as it is being formed in the various stages of the forming and sealing process. The air burst can be continuous, but is preferably metered to start as the film for the next bag is being pulled down through the completion of the transverse seal.

The head 180 can comprise any non-stick material but is preferably a fluoropolymer, such as Teflon®. In an alternative embodiment, the tucker bar 106 can comprise one integral piece of metal with the head portion 180 being coated with a fluoropolymer. The curved contact area of the head 180 allows for the continuous formation of the tuck illustrated in FIG. 5a without tearing the packaging film as it is pushed down below the forming tube. While shown with three orifices 186, the head 180 can comprise any number of orifices from one on.

To further compensate for the change in the width of the film tube as the transverse seal is formed by the seal jaws 108 of FIG. 6a, it should be noted that the tension bar 102 bends outwardly away from the center of said tube of film along the length of the tension bar 102 and the forming plates 104 are hinged by a horizontal hinge 165. If the tension bar 102 is designed otherwise (e.g., strictly vertical) excess slack occurs in the area of the film tube near the transverse seal. The forming plates 104 comprise horizontal hinges 165 that allow the forming plates to fold inward (i.e., toward each other) slightly while the lower transverse seal is formed. Otherwise, the tube of packaging film would be ripped by the tips of the forming plates 104 during this step.

The present invention offers an economic method of producing a stand-up pouch with numerous advantages over prior art horizontal stand-up pouches and methods for making them.

Examples of these advantages are illustrated in Table 1 below.

TABLE 1

|  | Current Vertical Flex Bag | Commercially Available Horizontal Stand-Up Pouches | Applicants' Vertical Stand-Up Bag |
| --- | --- | --- | --- |
| Machine Type | Standard Vertical FFS | Pouch Form, Fill, Seal | Standard Vertical FFS |
| Machine Cost | $75,000.00 | $500,000.00 | $75,000.00 |
| Film Cost | $0.04/bag | $0.08/bag | $0.04/bag |
| Gas Flush | Less than 2% $O_2$ | Only to 5% $O_2$ 2 hours | Less than 2% $O_2$ |
| Size Change | Easy, change former | | Easy, change former |
| Format Change | Flex Bag Only | Stand-Up Pouch Only | Both, simple change |
| Continuous Feed Zipper Option | No | Yes | Yes |
| Bag Size Range in Inches | (Width/Height) 5/5 through 14/24 | (Width/Height) 5/5 through 10/12 | (Width/Height) 5/5 through 24/11 |

As noted above and will be described in further detail below, a continuous feed zipper option is available on Applicants' invention, which is not available using current vertical form, fill, and seal machine technology. This is because of the orientation of the film graphics used on the packaging film of the present invention. Since the graphics are oriented 90° from the prior art, a zipper seal can be run continuously in a vertical line down the forming tube along with the packaging film as it is being formed into a tube and subsequent package. This is not possible with the prior art, because such orientation of a continuous vertical strip of a zipper seal would place such seal in a vertical orientation once the package is formed and stood up for display.

The invention is further an improvement over methods for manufacturing prior art flat bottom bags. Since the tucker mechanism of Applicants' invention is stationary during bag formation, the present invention eliminates the need for moving parts that push against the film tube for the formation of a gusset. This elimination of moving parts allows for increased bag production rates, significantly lower changeover times to pillow pouch production, and significantly fewer maintenance issues.

B. Flat Bottom Bag

Figure 5B:
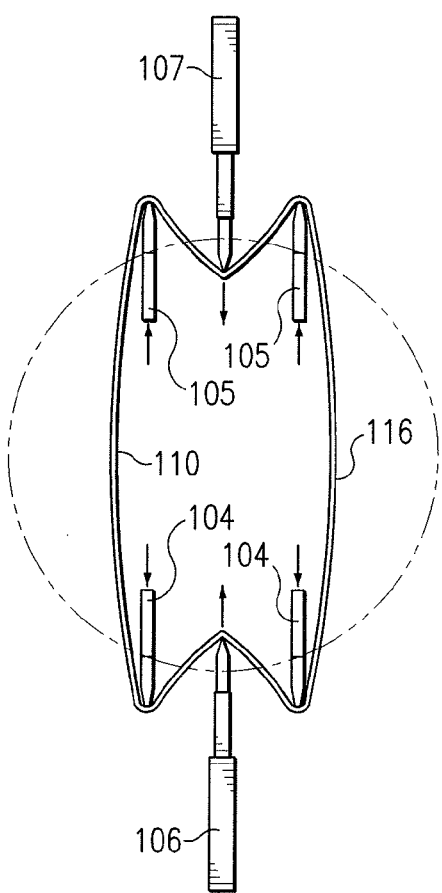
FIG. 5b is a schematic cross-section of a tube of packaging film formed by the flat bottom bag embodiment of the present invention methods.
Figure 6B:
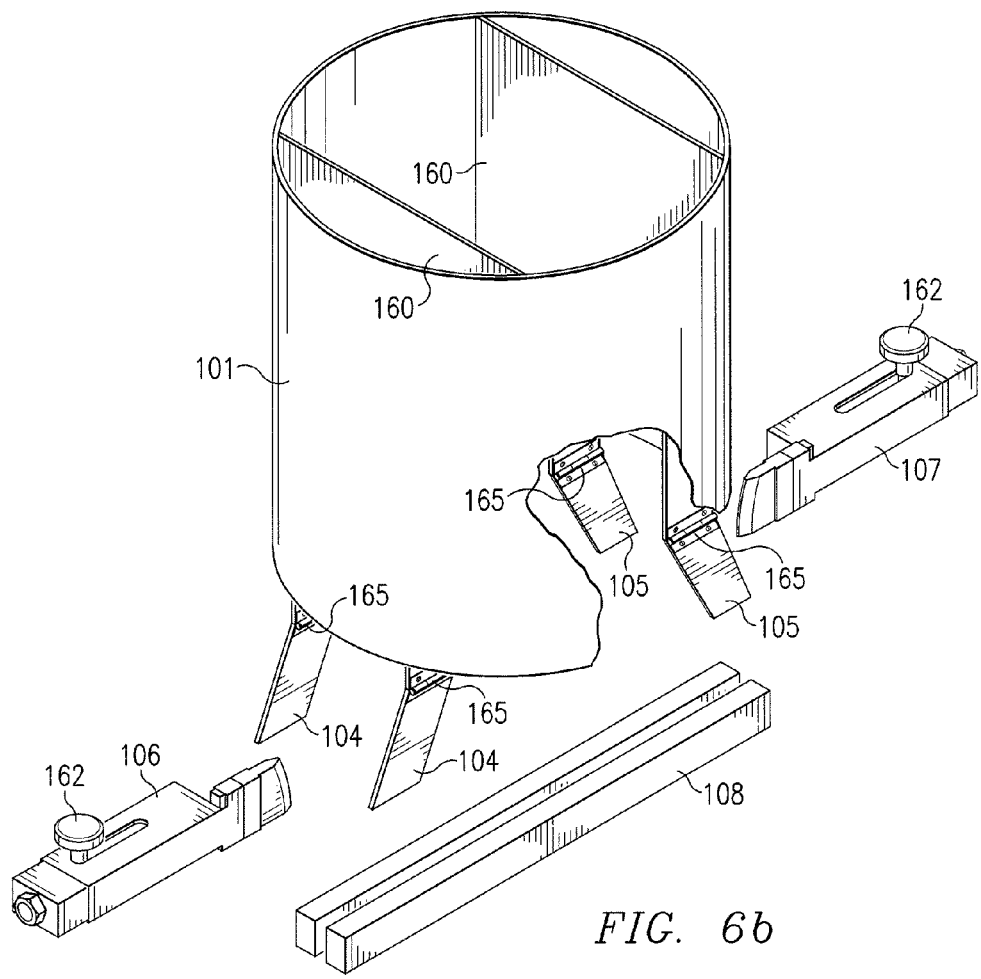
FIG. 6b is a perspective view of the tucker mechanism and forming plates in elevation of the flat bottom bag embodiment of the present invention in relation to a forming tube and sealing jaws of a vertical form, fill, and seal machine.

FIGS. 5b and 6b illustrate the basic components used with the method of the proposed invention as it relates to the manufacture of a flat bottom bag. FIG. 5b is a schematic cross-section of a tube of packaging material (film) formed by the present invention method. The tube of packaging film shown in FIG. 5b is illustrated as a cross-sectional area immediately below the forming tube 101 of FIG. 6b (shown in phantom in FIG. 5b). The tube of packaging film comprises an outer layer 116 and an inner layer 110, and can comprise material typically used in the field of art for making a standard vertical flex bag, such as discussed in relation to FIG. 1. However, for reasons that will become apparent from the discussion below, a preferred embodiment of the bag of the present invention comprises an outside layer 116 that is not sealable on itself, such as paper. The tube in FIG. 5b has been formed by sealing one sheet of film with a vertical back seal, as previously described with regard to discussions of prior art vertical form and fill machine methods.

FIG. 6b shows a forming tube 101 typical in most respects to those used with prior art vertical form, fill, and seal machines. This forming tube 101 can be a cylinder, have a rectangular cross section, or any number of shapes, but is preferably cylindrical as illustrated. The film illustrated in FIG. 5b is initially formed around the forming tube 101 of FIG. 6b. This forming tube 101 is shown in elevation but would normally be integrally attached to the vertical form, fill, and seal machine. Also shown in FIG. 6b are a pair of prior art sealing jaws 108 likewise illustrated in elevation. Not shown in FIG. 6b is the sealing jaw carriage on which such sealing jaws 108 would be mounted below the forming tube 101.

As previously described, the practice in the prior art in the manufacture of a vertical flex bag involves feeding a continuous packaging film directed around the forming tube 101. A back seal is formed on a single layer of film in order to create a tube of film around the forming tube 101. The seal jaws 108 close on the thus formed tube of packaging film, thereby forming a bottom transverse seal. Product is then dropped through the forming tube 101 into the tube of packaging film. The tube is then driven downward by friction against rotating belts (not shown) and the seal jaws 108 are used to form another transverse seal above the level of the product found inside the tube. This seal is subsequently cut horizontally such that a top transverse seal is formed at the top of the filled bag below and a bottom transverse seal is formed on the tube of packaging film above. The packaging film during the prior art operation described above is oriented perpendicular to the longitudinal translation of the film so as to be readable by an operator of the machine as the film travels down the forming tube 101. This orientation provides graphics 39 on the formed prior art bag that are readable by a consumer when the formed bag is placed on a retail display shelf while resting on its bottom transverse seal 33 as seen in FIG. 3a.

The invention adds two basic components to a prior art vertical form, fill, and seal machine. Two pair of stationary or fixed forming plates 104, 105 are used to hold the packaging film tube in tension from inside the tube, as indicated by the arrows illustrated on FIG. 5b. As shown in FIG. 6b, the forming plates 104, 105 can be attached directly to the forming tube 101 or, alternatively, to any supporting structure on the vertical form, fill, and seal machine, as long as the forming plates 104, 105 are positioned within the tube of packaging material, below the bottom of the forming tube 101, and above the heat sealing jaws 108.

Tension is applied on the outside of the film and in the opposite direction of the tension provided by the forming plates 104, 105 by two stationary or fixed tucker mechanisms 106, 107, alternatively referred to herein as tucker bars 106, 107, positioned between said forming plates 104, 105. The tucker bars 106, 107 are preferably attached to the sealing carriage for the vertical form, fill, and seal machine and are adjustable along all three axes (in/out, up/down, and front/back). Alternatively, the tucker bars 106, 107 can be attached to the frame of the vertical form, fill, and seal machine or any other point that can supports their function outside the film tube. These adjustments in all three axes allow for the tucker bars 106, 107 to be easily moved out of the way to convert the vertical form and fill machine back to standard operation and is accomplished, in the embodiment shown in FIG. 6*b*, by a tension screw 162 that can lock the tucker bars 106, 107 in place when tightened. While the tucker bars 106, 107 are adjustable, unlike in the prior art, they are fixed or stationary during operation. Therefore, the present invention is a substantial improvement over the art in that there are no moving parts to the tucker mechanism during bag making. This improvement is what Applicants intend to describe when referring to the tucker bars 106, 107 as "stationary" or "fixed." Because of this stationary tucker bar feature, bag making speeds can match typical pillow pouch manufacturing rates, modification costs are low (such as 3 to 4 thousand dollars per machine), and no additional maintenance issues are introduced.

When moved forward into position (i.e., toward the forming plates 104, 105), the tucker bars 106, 107 provide a crease or fold in the tube of the packaging film between the two forming plates 104, 105. This crease is formed prior to formation of the transverse seal by the seal jaws 108. Consequently, once the transverse seal is formed, the crease becomes an integral feature of two sides of the package, referred to as gussets. As shown in FIG. 3*b*, these gussets 37 form a "V" shape on each end of the horizontal transverse seals 31, 33 because the outer layer of packaging film used to form the bag comprises a material that does not seal on itself, such as paper. In an alternative embodiment, the outside layer 30 of the film comprises a material that seals on itself, thereby closing the ends of the "V" shaped gussets illustrated in FIG. 3*b*.

After the transverse seals are formed, the vertical form and fill machine thereafter operates basically as previously described in the prior art, with the sealing jaws 108 forming a lower transverse seal, product being introduced through the forming tube 101 into the sealed tube of packaging film (which now has a vertical crease on two opposite sides), and the upper transverse seal being formed, thereby completing the package. A major difference between a prior art package and Applicants' package, however, is that a gusset is formed on each side of the package of the present invention using the fixed mechanism described.

An example of the formed package of the instant invention is shown in FIG. 3*b*, which shows the outside layer of the packaging film 30 with the graphics 38 oriented as previously described. As can be seen from FIG. 3*b*, the construction of the invention's flat bottom bag shares characteristics with the prior art vertical flex bags shown in FIG. 3*a*. FIG. 3*b* shows the gussets 37 that were formed by the tucker bars 106, 107 and forming plates 104, 105 discussed in relation to FIGS. 5*b* and 6*b*.

Returning to FIG. 6*b*, another optional feature that can be incorporated into this invention is the use of one or two diversion plates 160 within the forming tube 101. These diversion plates 160, in the embodiment illustrated, comprise a flat plate welded vertically inside the forming tube 101 that extends from the bottom of the forming tube 101 to some distance above (for example, at least two or three inches) the bottom of the forming tube 101, where it then is sealed against the inside of the forming tube 101.

The diversion plates 160 in a preferred embodiment accomplish two functions. First, the diversion plates 160 keeps product that is dropped down the forming tube 101 away from the area where the crease is being formed on the tube of packaging film. Second, the diversion plates 160, if properly sealed against the forming tube 101, can be used as channels for a gas or nitrogen flush. In such instance, at least one, but preferably both diversion plates 160 at some point above the bottom of the forming tube 101 seal at the top of the plate 160 against the forming tube 101. Below such seal (not shown) one or more orifices can be drilled into the forming tube 101 in order to provide gas communication between an exterior gas (for example, nitrogen or oxygen) source and the cavity formed between a diversion plate 160 and the interior of the forming tube 101. The diversion plates 160 are shown in FIG. 6*b* as a flat plate, but it should be understood that they could be of any variety of shapes, for example, having a curved surface, provided that they accomplish the functionality of diverting the product away from the area where the tucks are formed on the tube of film.

By using one or more of the diversion plates 160 as a channel for the gas flush, the present invention eliminates the need for a separate gas tube to be placed inside the forming tube 101 that normally accomplishes the same function in the prior art. The added benefit of providing a relatively large volume channel formed by a diversion plate 160 and the interior of the forming tube 101 is that a relatively large volume of flushing gas can be introduced into a filled and partially formed package at a significantly lower gas velocity compared to prior art gas tubes. This allows for the filling of packages using this embodiment of the present invention that may contain low weight product that might otherwise be blown back into the forming tube by prior art flushing tubes.

FIG. 8 illustrates a preferred embodiment of a tucker bar 106. This embodiment of a tucker bar 106 comprises a head 180 attached to a support 182. Drilled within the support 182 and head 180 is a gas channel 184 shown in phantom on FIG. 8. This gas channel 184 provides a gas communication from an exterior gas source (not shown) through the support 182, the head 180, and out three orifices 186. The gas channel 184 allows for a metered burst of pressurized gas (typically air) that helps keep the tuck illustrated in FIG. 5*b* taut throughout the forming and sealing operation without the necessity of moving the tucker bar in and out during bag formation. It should be noted that during operation (bag making) the tucker bar 106 is always stationary. It should further be noted that the head 180 necessarily cannot extend along the entire length of the crease formed by the tucker bar 106 and forming plates 104. Further, it should be understood that when the sealing jaws 108 close onto the tube of film, the lateral dimensions of the tube of film change. All of these facts are compensated for by the use of the pressurized air bursting from the orifices 186. The pressurized air keeps an even amount of pressure on the tuck as it is being formed in the various stages of the forming and sealing process. The air burst can be continuous, but is preferably metered to start as the film for the next bag is being pulled down through the completion of the transverse seal.

The head 180 can comprise any non-stick material but is preferably a fluoropolymer, such as Teflon®. In an alternative embodiment, the tucker bar 106 can comprise one integral piece of metal with the head portion 180 being coated with a fluoropolymer. The curved contact area of the head 180 allows for the continuous formation of the tuck illustrated in FIG. 5*b* without tearing the packaging film as it is pushed down below the forming tube. While shown with three orifices 186, the head 180 can comprise any number of orifices from one on.

To further compensate for the change in the width of the film tube as the transverse seal is formed by the seal jaws 108 of FIG. 6*b*, it should be noted that the forming plates 104, 105 are hinged by a horizontal hinge 165. The forming plates 104, 105 comprise horizontal hinges 165 that allow the forming plates to fold inward (i.e., toward each other) slightly while the lower transverse seal is formed. Otherwise, the tube of packaging film would be ripped by the tips of the forming plates 104, 105 during this step.

The present invention offers an economic method of producing a flat bottom bag with numerous advantages over prior art horizontal stand-up pouches and methods for making them.

Examples of these advantages are illustrated in Table 2 below.

TABLE 2

|  | Current Vertical Flex Bag | Commercially Available Horizontal Stand-Up Pouches | Applicants' Flat Bottom Bag |
| --- | --- | --- | --- |
| Machine Type | Standard Vertical FFS | Pouch Form, Fill, Seal | Standard Vertical FFS |
| Machine Cost | $75,000.00 | $500,000.00 | $75,000.00 |
| Film Cost | $0.04/bag | $0.08/bag | $0.04/bag |
| Gas Flush | Less than 2% $O_2$ | Only to 5% $O_2$ | Less than 2% $O_2$ |
| Size Change | Easy, change former | 2 hours | Easy, change former |
| Format Change | Flex Bag Only | Stand-Up Pouch Only | Both, simple change |
| Bag Size Range in Inches (Width/Height) | 5/5 through 14/24 | (Width/Height) 5/5 through 10/12 | (Width/Height) 5/5 through 11/24 |

Further, the speed at which a form, fill, and seal machine modified by Applicants' invention can run is not compromised by the modification, as is the case with the prior art method for making a flat bottom bag using a triangular-shaped device that is moved in and out during operation. In fact, Applicants' invention allows bag production rates on the order of twice as fast as the prior art method for making the same style bag.

In addition, the lack of moving parts associated with the tucker mechanism of Applicants' invention greatly reduces the cost of converting a vertical form, fill, and seal machine to manufacturing flat bottom bags, as well as reduces maintenance issues involved thereby. For example, converting a vertical form, fill, and seal machine to a flat bottom bag configuration using prior art devices that move in and out during operation costs in the range of $30,000.00 per machine. Applicants' invention involves retrofitting existing vertical form, fill, and seal machines at a fraction, approximately 1/10th, of that cost.

C. Zipper Seal Insertion Mechanism

Figure 5C:
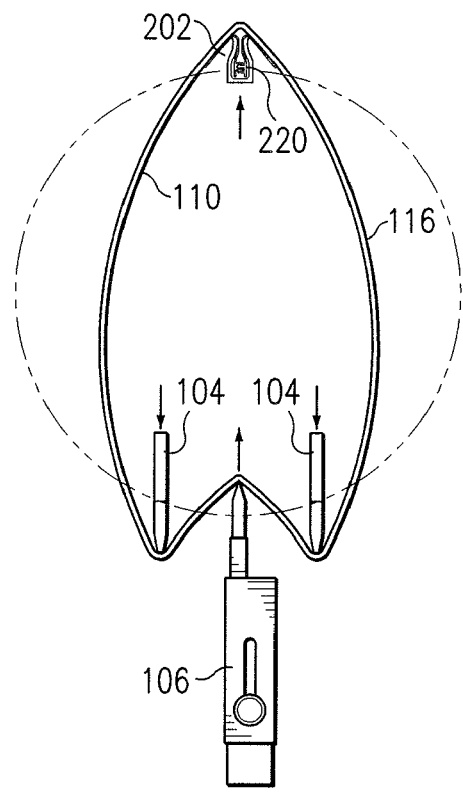
FIG. 5c is a schematic cross-section of a tube of packaging film formed by the vertical stand-up pouch having a zipper seal incorporated therein embodiment of the present invention methods.
Figure 6C:
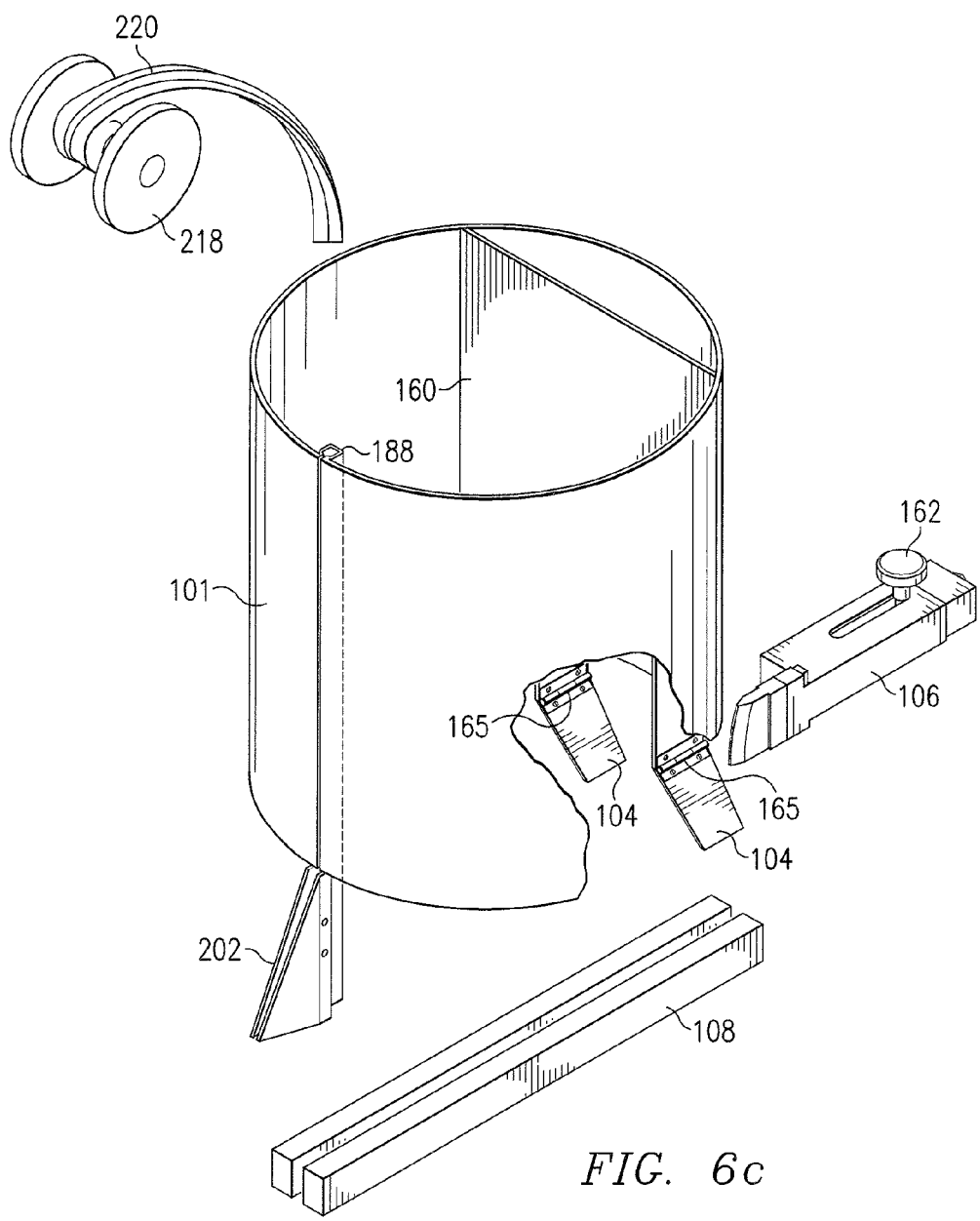
FIG. 6c is a perspective view of the tucker mechanism, forming plates, and zipper seal insertion mechanism in elevation of the vertical stand-up pouch having a zipper seal incorporated therein embodiment of the present invention in relation to a forming tube and sealing jaws of a vertical form, fill, and seal machine.

Another embodiment of the invention further includes an apparatus and method for producing a stand-up package having a zipper seal incorporated therein. FIGS. 5*c* and 6*c* illustrate the basic components used with the method of the proposed invention as it relates to the manufacture of a stand-up package having a zipper seal incorporated therein. The same reference numbers are used to identify the same corresponding elements throughout all drawings unless otherwise noted. FIG. 5*c* is a schematic cross-section of a tube of packaging material (film) formed by the present invention method. The tube of packaging film shown in FIG. 5*c* is illustrated as a cross-sectional area immediately below the forming tube 101 of FIG. 6*c*. The tube of packaging film comprises an outer layer 116 and an inner layer 110, and can comprise material typically used in the field of art for making a standard vertical flex bag, such as discussed in relation to FIG. 1. The tube in FIG. 5*c* has been formed by sealing one sheet of film with a vertical back seal, as previously described with regard to discussions of prior art vertical form and fill machine methods.

FIG. 6*c* shows a forming tube 101 typical in most respects to those used with prior art vertical form, fill, and seal machines. This forming tube 101 can be a cylinder, have a rectangular cross section, or any number of shapes. This forming tube 101 includes a channel track 188 formed along one side for receiving a length of zipper seal mechanism 220. The zipper seal mechanism 220 is typically supplied from a supply spool 218, which feeds the zipper seal mechanism 220 to the longitudinal channel 188 formed in or adjacent to the forming tube 101 of the vertical form, fill, and seal machine.

The length of zipper seal mechanism 220 may comprise either a continuous length of zipper seal mechanism 220 or separate segments of zipper seal mechanism 220 interspersed along an interconnecting webbing. As shown in FIG. 10, the length of zipper seal mechanism 220 is comprised of two opposing and interlocking zipper elements or members 222, 226. Each of the zipper members 222, 226 include a tab portion and an interlocking profile portion. For example, a first zipper element 222 includes a tab portion 223 and a male interlocking profile portion 224; while the second zipper element 226 includes a tab portion 227 and a female interlocking profile portion 228.

The packaging film illustrated in FIG. 5*c* is initially formed around the forming tube 101 of FIG. 6*c*. However, prior to sealing the one sheet of film with a vertical back seal, at least a portion of the zipper seal mechanism 220 is sealed to the surface of the packaging film which will subsequently comprise the inner layer 110 of the tube. This forming tube 101 is shown in elevation but would normally be integrally attached to the vertical form, fill, and seal machine. Also shown in FIG. 6*c* are a pair of prior art sealing jaws 108 likewise illustrated in elevation. Not shown in FIG. 6*c* is the sealing jaw carriage on which such sealing jaws 108 would be mounted below the forming tube 101.

As previously described, the practice in the prior art in the manufacture of a vertical flex bag involves feeding a continuous packaging film directed around the forming tube 101. A back seal is formed on a single layer of film in order to create a tube of film around the forming tube 101. The seal jaws 108 close on the thus formed tube of packaging film, thereby forming a bottom transverse seal. Product is then dropped through the forming tube 101 into the tube of packaging film. The tube is then driven downward by friction against rotating belts (not shown), and the seal jaws 108 are used to form another transverse seal above the level of the product found inside the tube. This seal is subsequently cut horizontally such that a top transverse seal is formed at the top of the filled bag below and a bottom transverse seal is formed on the tube of packaging film above. The packaging film during the prior art operation described above is oriented perpendicular to the longitudinal translation of the film so as to be readable by an operator of the machine as the film travels down the forming tube 101. This orientation provides graphics 39 on the formed prior art bag that are readable by a consumer when the formed bag is placed on a retail display shelf while resting on its bottom transverse seal 33 as seen in FIG. 3*a*. As described in the previous embodiments of the invention, the orientation of the graphics on the film packaging for Applicants' present invention is 90° off of the prior art orientation, such that the graphics appear sideways as viewed by the operator of the vertical form, fill, and seal machine as the film is pulled down the forming tube 101 of FIG. 6*c*.

The present invention adds several basic components to a prior art vertical form, fill, and seal machine. Two forming plates 104 and a tension insertion mechanism 202 are used to hold the packaging film tube in tension from inside the tube, as indicated by the arrows illustrated on FIG. 5*c*. As shown in FIG. 6*c*, the forming plates 104 and tension insertion mechanism 202 can be attached directly to the forming tube 101 or, alternatively, to any supporting structure on the vertical form, fill, and seal machine, as long as the forming plates 104 and the tension insertion mechanism 202 are positioned within the tube of packaging material, below the bottom of the forming tube 101, and above the heat sealing jaws 108.

Tension is applied on the outside of the film and in the opposite direction of the tension provided by the forming plates 104 by a fixed or stationary tucker mechanism 106, alternatively referred to herein as a tucker bar 106, positioned between said forming plates 104. The tucker bar 106 is preferably attached to the sealing carriage for the vertical form, fill, and seal machine and is adjustable along all three axes (in/out, up/down, and front/back). Alternatively, the tucker bar 106 can be attached to the frame of the vertical form, fill, and seal machine or any other point that can supports its function outside the film tube. These adjustments in all three axes allow for the tucker bar 106 to be easily moved out of the way to convert the vertical form and fill machine back to standard operation and is accomplished, in the embodiment shown in FIG. 6*c*, by a tension screw 162 that can lock the tucker bar 106 in place when tightened. While the tucker bar 106 is adjustable, unlike in the prior art, it is fixed or stationary during operation. Therefore, the present invention is a substantial improvement over the art in that there are no moving parts to the tucker mechanism during bag making. This improvement is what Applicants intend to describe when referring to the tucker bar 106 as "stationary" or "fixed." Because of this stationary tucker bar feature, bag making speeds can match typical pillow pouch manufacturing rates.

When moved forward into position (i.e., toward the forming plates 104), the tucker bar 106 provides a crease or fold in the tube of the packaging film between the two forming plates 104. This crease is formed prior to formation of the transverse seal by the seal jaws 108. Consequently, once the transverse seal is formed, the crease becomes an integral feature of one side of the package.

The present invention further includes a channel track 188 formed along one side of the forming tube 101 and adapted for receiving a length of zipper seal mechanism 220 from a supply spool 218. As will be subsequently explained, the channel track 188 may either be formed or fashioned into the sidewall of the forming tube 191 or comprise a longitudinal gap between two heat seal plates attached to the sidewall of the forming tube 191. Regardless of the embodiment selected, the channel track 188 performs two critical functions. First, the channel track 188 effectively controls the positioning of the zipper seal mechanism 220 along the inner layer 110 of the tube. Second, the channel track 188 protects the interlocked profile portions 224, 228 of the zipper seal mechanism 220 from fusing together when the tab portions 223, 227 are heat sealed to the inner layer 110 of the formed tube.

Thus, in accordance with the present invention, a length of zipper seal mechanism 220 is directed to the top portion of the forming tube 101 such that the two interlocked zipper members 222, 226 are together threaded down the channel track 188 formed along one side of the forming tube 101. The associated tab portions 223, 227 of zipper seal mechanism 220 are splayed out along the outer peripheral surface of the forming tube 101 so as not to overlap one another. Packaging film is initially formed around the forming tube 101 in a conventional manner. However, prior to sealing the one sheet of film with a vertical back seal, at least a portion of each of the tab portions 223, 227 of the zipper seal mechanism 220 is sealed to the surface of the packaging film which will subsequently comprise the inner layer 110 of the tube. Thus, as the formed tube is advanced down the forming tube 101 in a conventional manner, the length of zipper mechanism 220 that is sealed on the interior of the formed tube is also advanced.

Figure 5D:
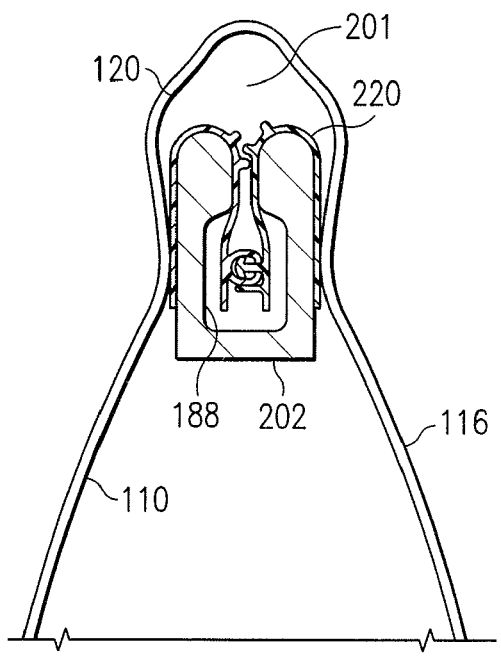
FIG. 5d is an enlarged view of the top of the schematic cross-section of a tube of packaging film formed by the vertical stand-up pouch having a zipper seal incorporated therein shown in FIG. 5c.

Referring now FIGS. 5*c*, 5*d* and 6*c*, at the bottom of the forming tube 101, the channel track 188 extends through the tension insertion mechanism 202 such that as tension is applied to the advancing formed tube, the associated tab portions 223, 227 of the zipper seal mechanism 220 are projected away from the surface of the forming tube 101 and bent around two projecting plates 192*a*, 192*b* of the tension insertion mechanism 202 thereby blousing the packaging film between the two portions of the associated tab portions 223, 227 sealed to the inner layer 110 of the formed tube. This blousing creates a headspace 201 between the film and the interlocked profile portions 224, 228 of the zipper seal mechanism 220. The creation of the headspace 201 improves the sealing qualities of the traverse seal subsequently applied to the package.

The vertical form, fill, and seal machine of the present invention thereafter operates basically as previously described in the prior art, with the sealing jaws 108 forming a lower transverse seal, product being introduced through the forming tube 101 into the sealed tube of packaging film (which now has a crease on one side and a zipper seal on another side), and the upper transverse seal being formed, thereby completing the package.

The major differences between a prior art package and this embodiment of Applicants' package, however, are that a crease is formed on one side (which later becomes the bottom of the formed package) using the fixed mechanism described, a length zipper seal mechanism 220 in sealed onto the inner layer 110 of another side (which later becomes the top of the formed package) using the channel track 188 and the fixed tension insertion mechanism 202 described, and that the graphics on the packaging film used by the invention are oriented such that when the formed package is stood onto its end with the creased end generally at the bottom and the zipper seal end generally at the top, the graphics are readable by a consumer.

Figure 7C:
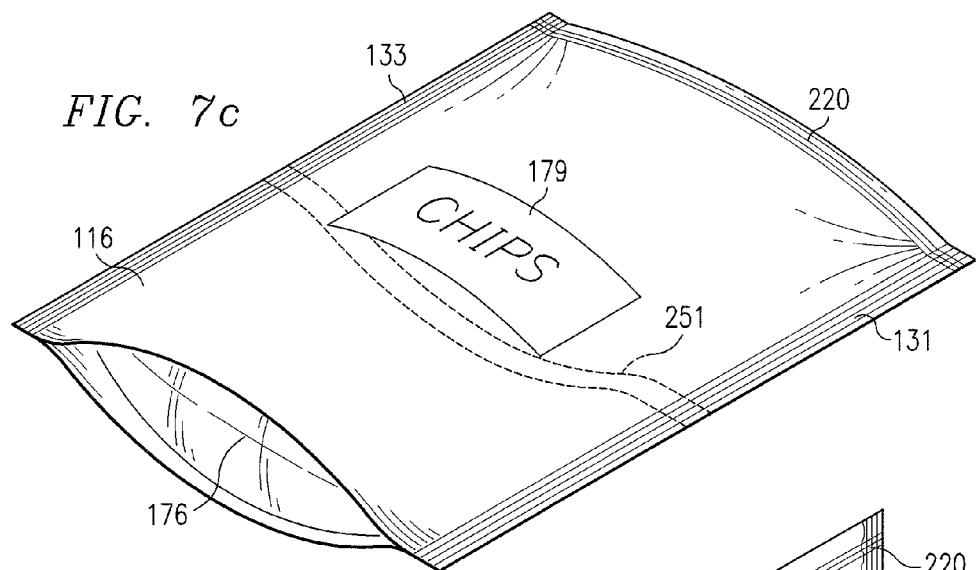
FIGS. 7c and 7d are perspective views of the vertical stand-up pouch having a zipper seal incorporated therein of the present invention.
Figure 7D:
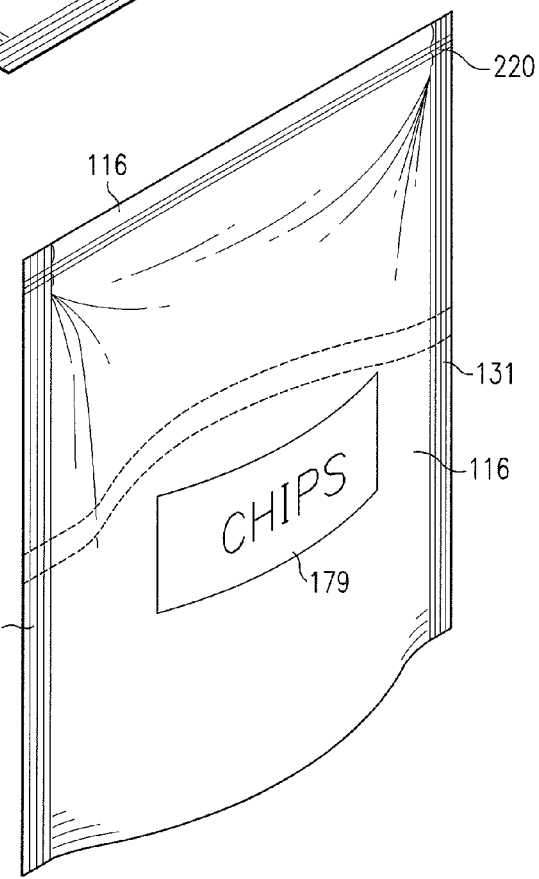

An example of the formed package of the instant invention is shown in FIGS. 7*c* and 7*d*, which show the outside layer of the packaging film 116 with the graphics 179 oriented as previously described. As can be seen from FIGS. 7*c* and 7*d*, the construction of the invention's vertical stand-up pouch shares characteristics with the prior art vertical flex bags shown in FIG. 3*a*. However, the transverse seals 131, 133 of the vertical stand-up bag of the invention are oriented vertically and the vertical back seal 251 is oriented horizontally once the bag stands up on one end, as shown in FIG. 7d. FIG. 7c shows the crease 176 that is formed by the tucker bar 106 and forming plates 104 and the zipper seal mechanism 220 positioned and sealed on the package interior as previously discussed in relation to FIGS. 5c and 6c.

As noted previously, the added ability to insert a zipper seal mechanism 220 enabled by Applicants' invention, is not available using current vertical form, fill, and seal machine technology. This is due, in part, to the orientation of the film graphics used on the packaging film of the present invention. Since the graphics are oriented 90° from the prior art, a zipper seal mechanism 220 can be run longitudinally along the forming tube adjacent with the packaging film as it is being formed into a tube. This is not possible with the prior art because such an orientation of a vertical length of a zipper seal would place such seal in a vertical orientation once the package is formed and stood up for display.

Returning to FIG. 6c, another optional feature that can be incorporated into this invention is the use of a diversion plate 160 within the forming tube 101. This diversion plate 160, in the embodiment illustrated, is a flat plate welded vertically inside the forming tube 101 that extends from the bottom of the forming tube 101 to some distance above (for example, at least two or three inches) the bottom of the forming tube 101, where it then is sealed against the inside of the forming tube 101.

The diversion plate 160 in a preferred embodiment accomplishes two functions. First, the diversion plate 160 keeps product that is dropped down the forming tube 101 away from the area where the crease is being formed on the tube of packaging film. Second, the diversion plate 160, can be used as a channel for a gas or nitrogen flush. In such instance, the diversion plate 160 at some point above the bottom of the forming tube 101 seals at the top of the plate 160 against the forming tube 101. Below such seal (not shown) an orifice can be drilled into the forming tube 101 in order to provide gas communication between an exterior gas (e.g., nitrogen or oxygen) source and the cavity formed between the diversion plate 160 and the interior of the forming tube 101. The diversion plate 160 as shown in FIG. 6c is a flat plate, but it should be understood that it can be of any variety of shapes, for example, having a curved surface, provided that it accomplishes the functionality of diverting the product away from the area where the tuck is formed on the tube of film.

By using the diversion plate 160 as a channel for the gas flush, the present invention eliminates the need for a separate gas tube to be placed inside the forming tube 101 that normally accomplishes the same function in the prior art. The added benefit of providing a relatively large volume channel formed by the diversion plate 160 and the interior of the forming tube 101 is that a relatively large volume of flushing gas can be introduced into a filled and partially formed package at a significantly lower gas velocity compared to prior art gas tubes. This allows for the filling of packages using this embodiment of the present invention that may contain low weight product that might otherwise be blown back into the forming tube by prior art flushing tubes.

FIG. 8 illustrates a preferred embodiment of the tucker bar 106. This embodiment of the tucker bar 106 comprises a head 180 attached to a support 182. Drilled within the support 182 and head 180 is a gas channel 184 shown in phantom on FIG. 8. This gas channel 184 provides a gas communication from an exterior gas source (not shown) through the support 182, through the head 180, and out three orifices 186. The gas channel 184 allows for a metered burst of pressurized gas (typically air) that helps keep the tuck illustrated in FIG. 5c taut throughout the forming and sealing operation without the necessity of moving the tucker bar in and out during bag formation. It should be noted that during operation (bag making) the tucker bar 106 is always stationary. It should further be noted that the head 180 necessarily cannot extend along the entire length of the crease formed by the tucker bar 106 and forming plates 104. Further, it should be understood that when the sealing jaws 108 close onto the tube of film, the lateral dimensions of the tube of film change. All of these facts are compensated for by the use of the pressurized air bursting from the orifices 186. The pressurized air keeps an even amount of pressure on the tuck as it is being formed in the various stages of the forming and sealing process. The air burst can be continuous, but is preferably metered to start as the film for the next bag is being pulled down through the completion of the transverse seal.

The head 180 can comprise any non-stick material but is preferably a fluoropolymer, such as Teflon®. In an alternative embodiment, the tucker bar 106 can comprise one integral piece of metal with the head portion 180 being coated with a fluoropolymer. The curved contact area of the head 180 allows for the continuous formation of the tuck illustrated in FIG. 5c without tearing the packaging film as it is pushed down below the forming tube. While shown with three orifices 186, the head 180 can comprise any number of orifices from one on.

To further compensate for the change in the width of the film tube as the transverse seal is formed by the seal jaws 108 of FIG. 6c, it should be noted that the two projecting plates 192a, 192b of the tension insertion mechanism 202 project outwardly away from the center of said tube of film along the length of the tension insertion mechanism 202 and the forming plates 104 may be hinged by a horizontal hinge 165. If the tension insertion mechanism 202 is designed otherwise (e.g., strictly vertical) excess slack occurs in the area of the film tube near the transverse seal. The forming plates 104 may include horizontal hinges 165 that allow the forming plates to fold inward (i.e., toward each other) slightly while the lower transverse seal is formed. Otherwise, the tube of packaging film would be ripped by the tips of the forming plates 104 during this step.

As noted with previously described embodiments, the instant invention is further an improvement over methods for manufacturing prior art flat bottom bags. Since the tucker mechanism of Applicants' invention is stationary during bag formation, the present invention eliminates the need for moving parts that push against the film tube for the formation of a gusset. This elimination of moving parts allows for increased bag production rates, significantly lower changeover times to pillow pouch production, and significantly fewer maintenance issues.

D. Quick Change Module

Figure 9A:
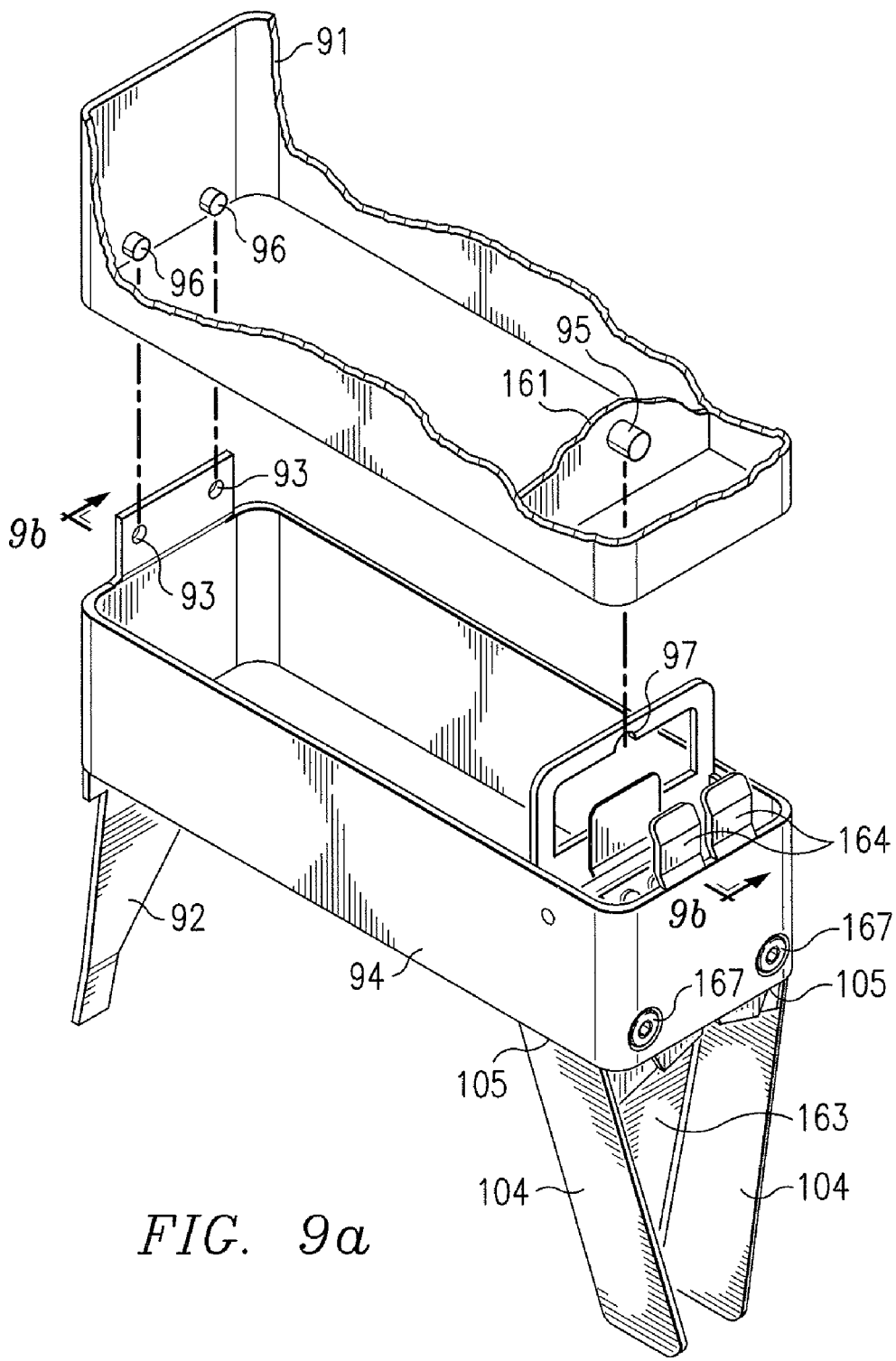
FIG. 9a is a perspective view of one embodiment of the quick change module of the present invention in elevation below the bottom of a forming tube.

Whether the vertical stand-up pouch embodiment or the flat bottom bag embodiment of the present invention is used, another embodiment of the invention incorporates a quick change module that can be installed on the bottom of a forming tube in order to quickly modify a vertical form, fill, and seal machine from pillow pouch production to the desired stand-up bag production of the present invention. One embodiment of this quick change module, as it relates particularly vertical stand-up pouches, is illustrated by FIGS. 9a, 9b, and 9c. FIG. 9a is a perspective view in elevation of the quick change module 94 suspended below the bottom of a forming tube 91 shown partially cut away in order to illustrate interior features. FIG. 9b is a sectional view of the same embodiment of said quick change module 94 shown attached to the bottom of the forming tube 91. The sectional view of FIG. 9b is taken along reference lines 9b—9b of FIG. 9a. FIG. 9c is a side view in elevation of the same quick change module embodiment.

With reference to FIGS. 9a, 9b, and 9c, it can be seen that the embodiment illustrated shows that the quick change module 94 comprises one pair of forming plates 104 and one tension bar 92, which must perform the same functions as similar elements described above with relation to the vertical stand-up pouch. The module 94 is attached to the bottom of a forming tube 91, as will be described below. The forming tube 91 illustrated in FIGS. 9a and 9b is shown as a rectangular shape. Consequently, the module 94 is likewise rectangularly shaped. It should be understood, however, that the shape of the forming tube 91 and corresponding shape of the module 94 can be any number of shapes, such as a circle, an oval, a square, or other shapes.

The module 94, for the embodiment shown, attaches to the bottom of the forming tube 91 by first inserting one or more tabs 96 that are integral to the forming tube into corresponding holes 93 that are integral to the module 94. The module 94 is thereafter secured by placing a tab 95 that is integral with a diverter plate 161 into a tab guide 97 that is integral with a diverter tongue 163. As is evident from FIG. 9b, this diverter tongue 163 rotates about a pin 168 that extends through a collar 166. When the diverter tongue 163 is rotated in the direction of the arrow illustrated in FIG. 9b, the tab guide 97 is lifted over the tab 95. The tab guide 97 is biased in the opposite direction of the rotation indicated by the arrow in FIG. 9b by a spring 170. Pressure is maintained on the inside area of the forming tube 91 in the vicinity of the tabs 96 by virtue of one or more tongues 164 that fit on the inside opposite wall of the forming tube 91. Consequently, once the module 94 is properly installed on the base of the forming plate 91, the tabs 96 retain their position in their respective holes 93. Likewise, the diverter plate tab 95 retains its position in the tab guide 97.

As with the previous embodiments of the invention described above, the module embodiment illustrated also incorporates a diverter 161. The diverter is used in combination with the diverter tongue 163 to keep product away from the vertical gusset areas. This diverter 161 can likewise be used as a gas flushing channel in addition to serving the purpose of keeping product away from the gussets formed by the forming plates 104, as previously described above.

Also as with previous embodiments, the forming plates 104 can swing towards each other by rotating about a hinge 105. This hinge 105 comprises a bolt 167 about which a shoulder 169 rotates. The shoulder 169 is in turn attached to the forming plates 104. This arrangement allows for the forming plates 104 to rotate about the bolts 167 and avoid ripping of the packaging film when the transverse seals are being formed below the forming plates by the transverse seal jaws (not shown).

While the embodiment illustrated in FIGS. 9a, 9b, and 9c is used for constructing vertical stand-up pouches, it should be understood that a second embodiment of the module 94 having the forming plates 104, diverter 161, diverter tongue 163, and all accompanying components being duplicated on the side of the module 94 presently illustrated with the tension bar 92, can be used to manufacture flat bottom bags. In other words, the flat bottom bag embodiment of the module can be easily understood by drawing a vertical line down the center of FIG. 9b. All of the components on the right-hand side of such vertical line are then reproduced in mirror image on the left-hand side of the vertical line, thereby replacing the tension bar 92 elements with another pair of forming plates 104 and the diverter tongue 163, etc . . . .

Another embodiment of the quick change module of the present invention comprises a module that can be installed on the bottom of a forming tube in order to quickly modify a vertical form, fill, and seal machine from the pillow pouch or the stand-up bag production to the production of stand-up packages having a zipper seal incorporated therein.

Figure 11:
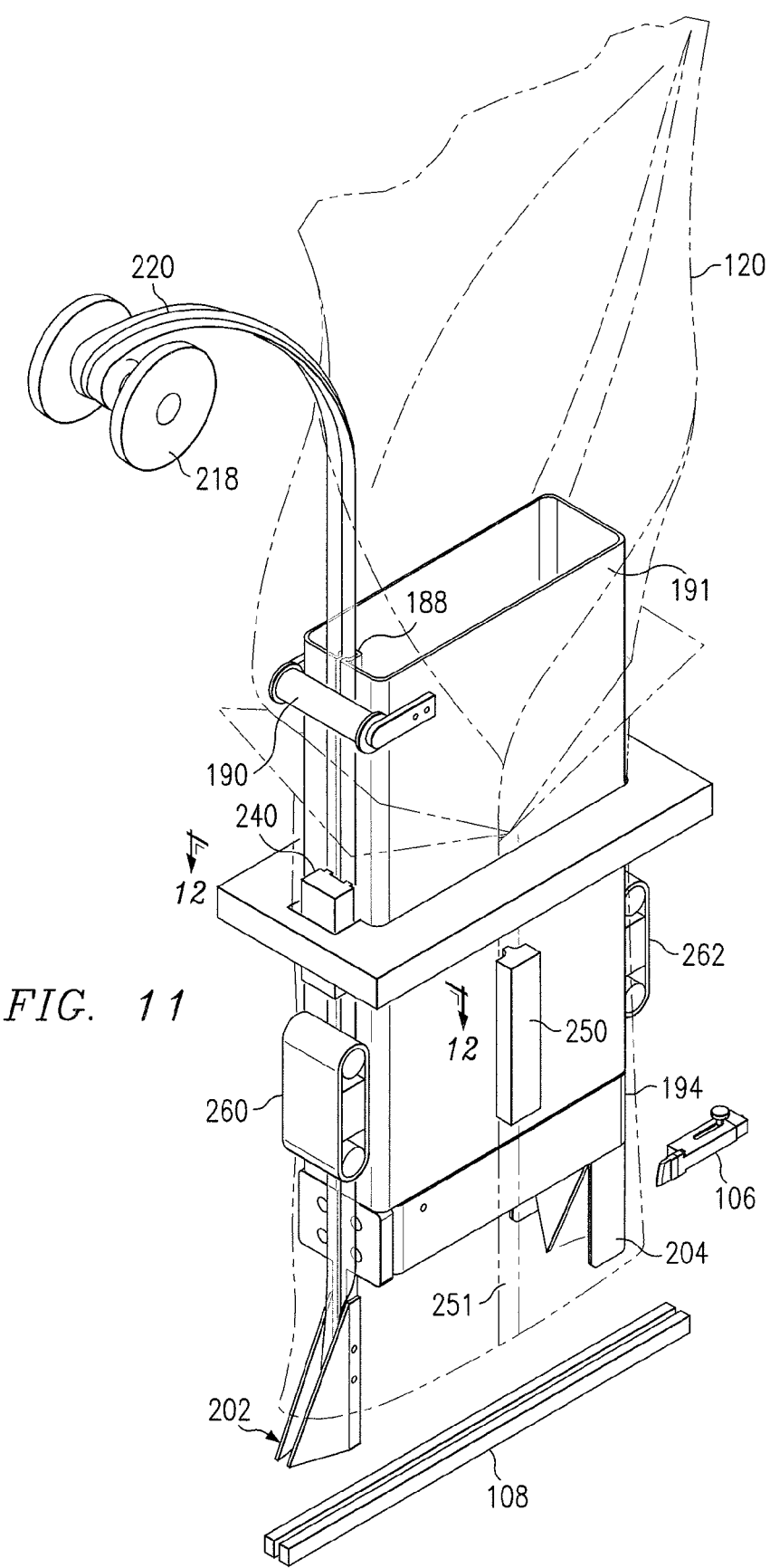
FIG. 11 is a simplified perspective view of a form, fill, and seal packaging machine adapted to manufacture a stand-up pouch having a zipper seal incorporated therein in accordance with the present invention.

One embodiment of a vertical form, fill, and seal machine adapted for receiving this quick change module, as it relates particularly vertical stand-up pouches, is illustrated by FIG. 11. The forming tube 191 illustrated in FIG. 11 is shown as having a rectangular shape. Consequently, the module 194 is likewise rectangularly shaped. It should be understood, however, that the shape of the forming tube 191 and corresponding shape of the module 194 can be any number of shapes, such as a circle, an oval, a square, or other shapes. This forming tube 191 also includes a channel track 188 formed along one side for receiving a length of zipper seal mechanism 220 from a supply spool 218. As previously shown in FIG. 10, the length of zipper seal mechanism 220 is comprised of two interlocking zipper elements 222, 226. Each of the zipper elements 222, 226 include a tab portion and an interlocking profile portion. For example, a first zipper element 222 includes a tab portion 223 and a male interlocking profile portion 224; while the second zipper element 226 includes a tab portion 227 and a female interlocking profile portion 228.

In accordance with the present invention, a length of zipper seal mechanism 220 is directed to the top portion of the forming tube 191 having a channel track 188 formed along one side such that the two interlocked profile portions 224, 228 of the zipper seal mechanism 220 are threaded down through the channel track 188. The associated tab portions 223, 227 of zipper seal mechanism 220 are splayed out along the outer peripheral surface of the forming tube 191 by a roller mechanism 190 so as not to overlap one another.

In one embodiment, the channel track 188 comprises a deep groove fashioned into the outer peripheral surface of the forming tube 191. Thus, as shown in FIG. 12a, in cross section the channel track 188 is located on the interior of the forming tube 191. In an alternative embodiment shown in FIG. 12b, the channel track 188A is positioned on the exterior of the forming tube 191. The channel track 188A comprises a gap between two heat seal plates 246, 248 extending longitudinally along and attached to the outer peripheral surface of a side of the forming tube 191.

The packaging film 120 (illustrated in phantom in FIG. 11) is initially formed around the forming tube 191 in a conventional manner. However, prior to sealing the sheet of packaging film 120 with a vertical back seal 251 using a back heat seal bar 250, at least a portion of each of the tab portions 223, 227 of the zipper seal mechanism 220 is sealed to the surface of the packaging film 120. Thus, the tab portions 223, 227 are sealed to the inner layer 110 of the tube that is created subsequently by the vertical back seal 251. As shown in FIGS. 12a and 12b, the zipper heat seal bar 240 typically comprises multiple individual heating surfaces (e.g., 242, 244) for imparting a narrow heat seal on only a portion of each of the tab portions 223, 227 of the zipper seal mechanism 220.

As shown in FIG. 11, the zipper heat seal bar 240 is positioned above and approximately 90° out of phase from the back heat seal bar 250. The tube is driven downward by an advancing mechanism (e.g., friction against rotating belts 260, 262). Thus, as the formed tube is advanced down the forming tube 191 in a conventional manner, the length of zipper mechanism 220 sealed on the interior of the formed tube is also advanced.

In accordance with one embodiment of the present invention, the zipper heat seal bar 240 and the back heat seal bar 250 each reciprocate concurrently with one another and consecutively with the advancing means. That is to say, the advancing means advances a specific length of the tubular shaped material packaging film 120 and stops; whereupon, the zipper heat seal bar 240 and the back heat seal bar 250 each reciprocate into contact with the packaging film 120 imparting heat seals to the zipper seal mechanism 220 and vertical back seal 251, respectively. However, as best illustrated in FIG. 11, due to the configuration of the zipper heat seal bar 240 and the back heat seal bar 250, at least a portion of the zipper seal mechanism 220 is always attached to the packaging film 120 prior to the imparting of the vertical back seal 251.

The forming tube 191 is shown in elevation but would normally be integrally attached to the vertical form, fill, and seal machine. Also shown in FIG. 11 are a pair of prior art sealing jaws 108 likewise illustrated in elevation. Not shown in FIG. 11 is the sealing jaw carriage on which such sealing jaws 108 would be mounted below the forming tube 191.

At the bottom of the forming tube 191, a quick change module 194 is installed which quickly modifies the vertical form, fill, and seal machine from the pillow pouch or the stand-up bag production to the production of stand-up packages having a zipper seal incorporated therein. As will be subsequently explained in greater detail, the quick change module 194 incorporates two forming plates 204 and a tension insertion mechanism 202 as previously described for producing stand-up packages having a zipper seal incorporated therein.

Additionally, as with previous embodiments, the module 194 also incorporates forming plates 204 that can swing towards each other by rotating about a hinge 205. This hinge 205 comprises a bolt 267 about which a shoulder 269 rotates. The shoulder 269 is in turn attached to the forming plates 204. This arrangement allows for the forming plates 204 to rotate about the bolts 267 and avoid ripping of the packaging film when the transverse seals are being formed below the forming plates by the transverse seal jaws 108 as shown in FIG. 11.

Figure 13A:
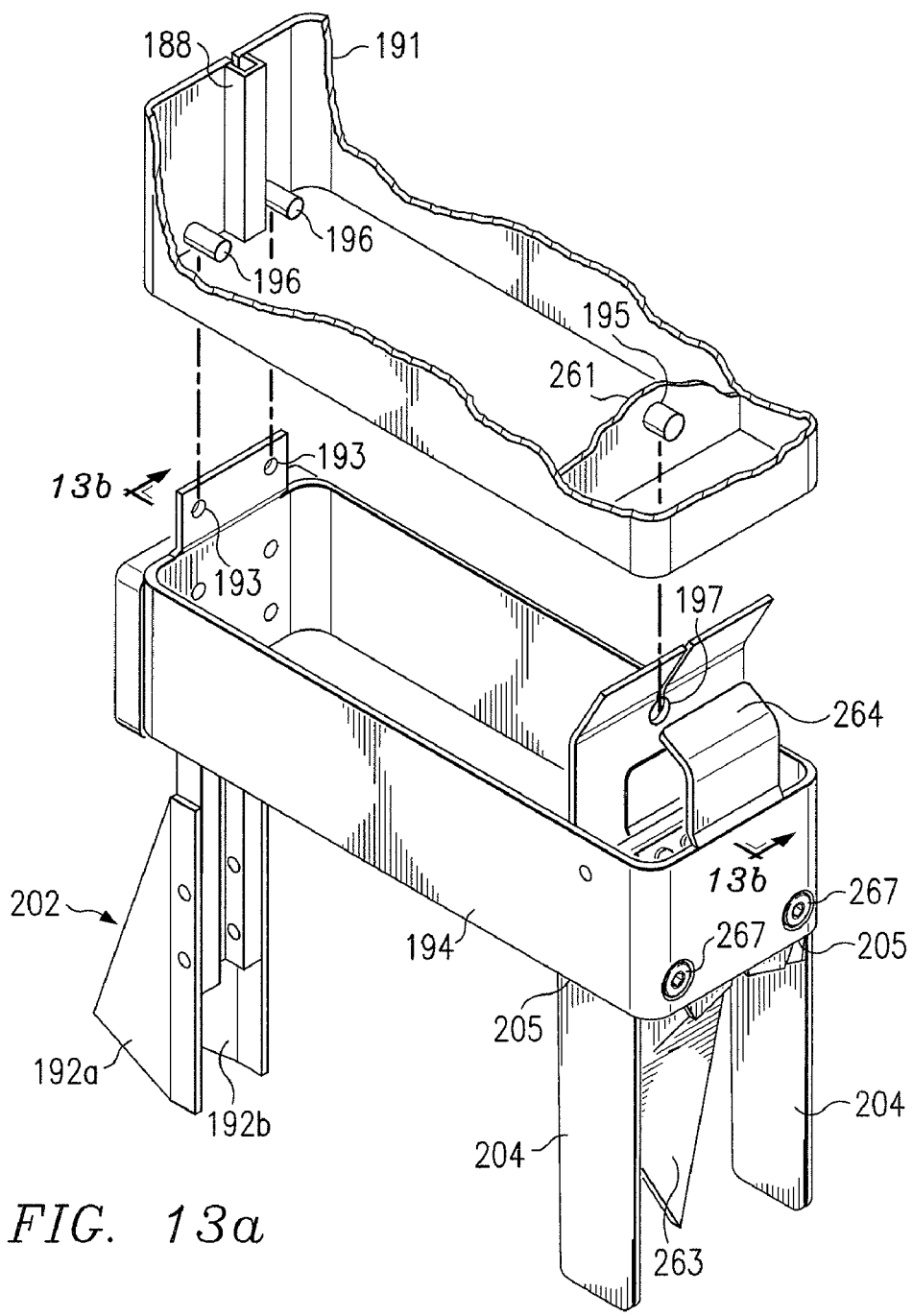
FIG. 13a is a perspective view of one embodiment of the zipper seal insert quick change module of the present invention in elevation below the bottom of a forming tube.
Figure 13B:
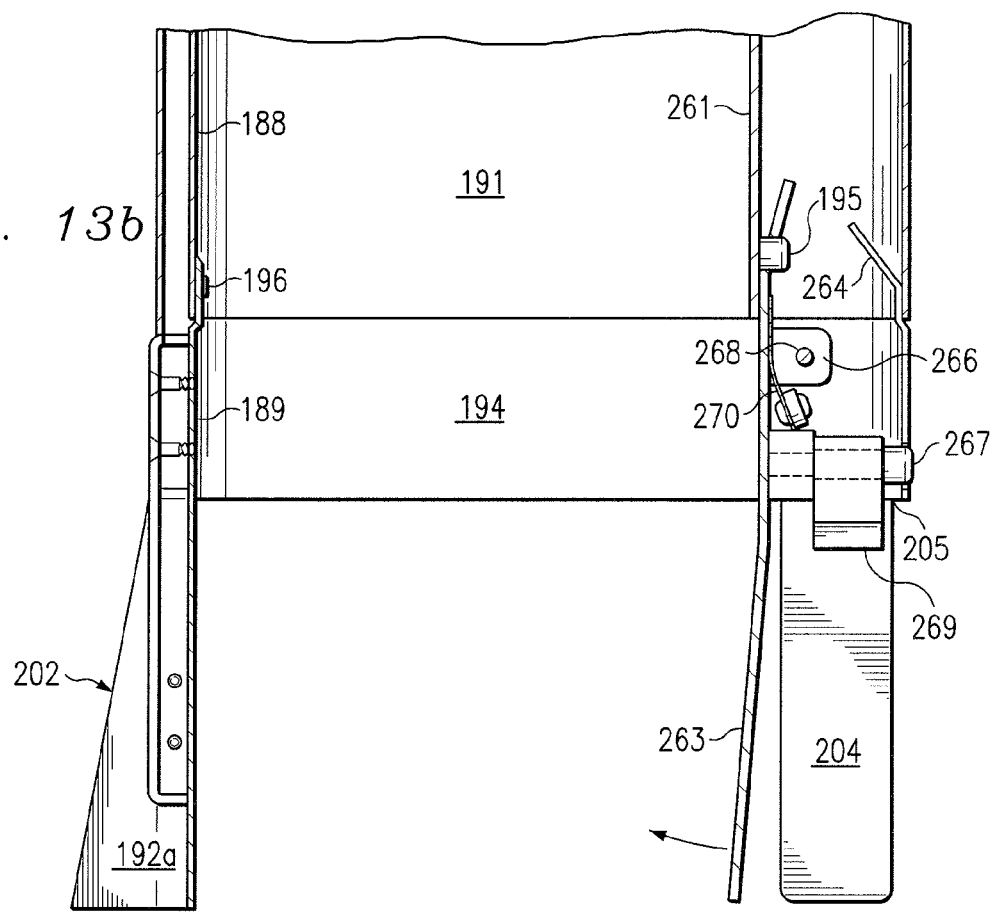
Figure 13C:
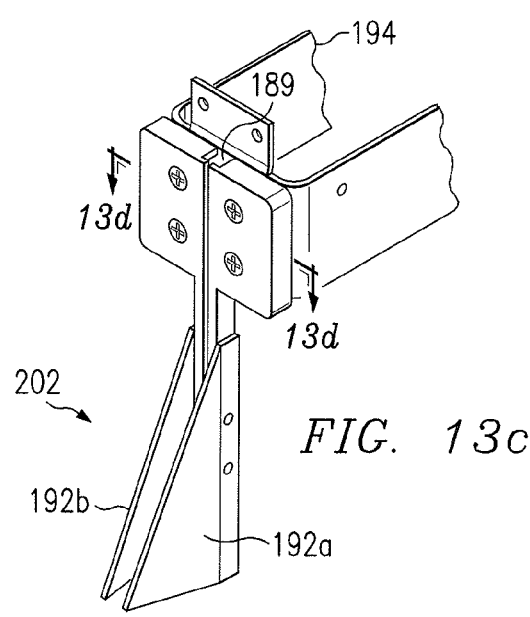
Figure 13D:
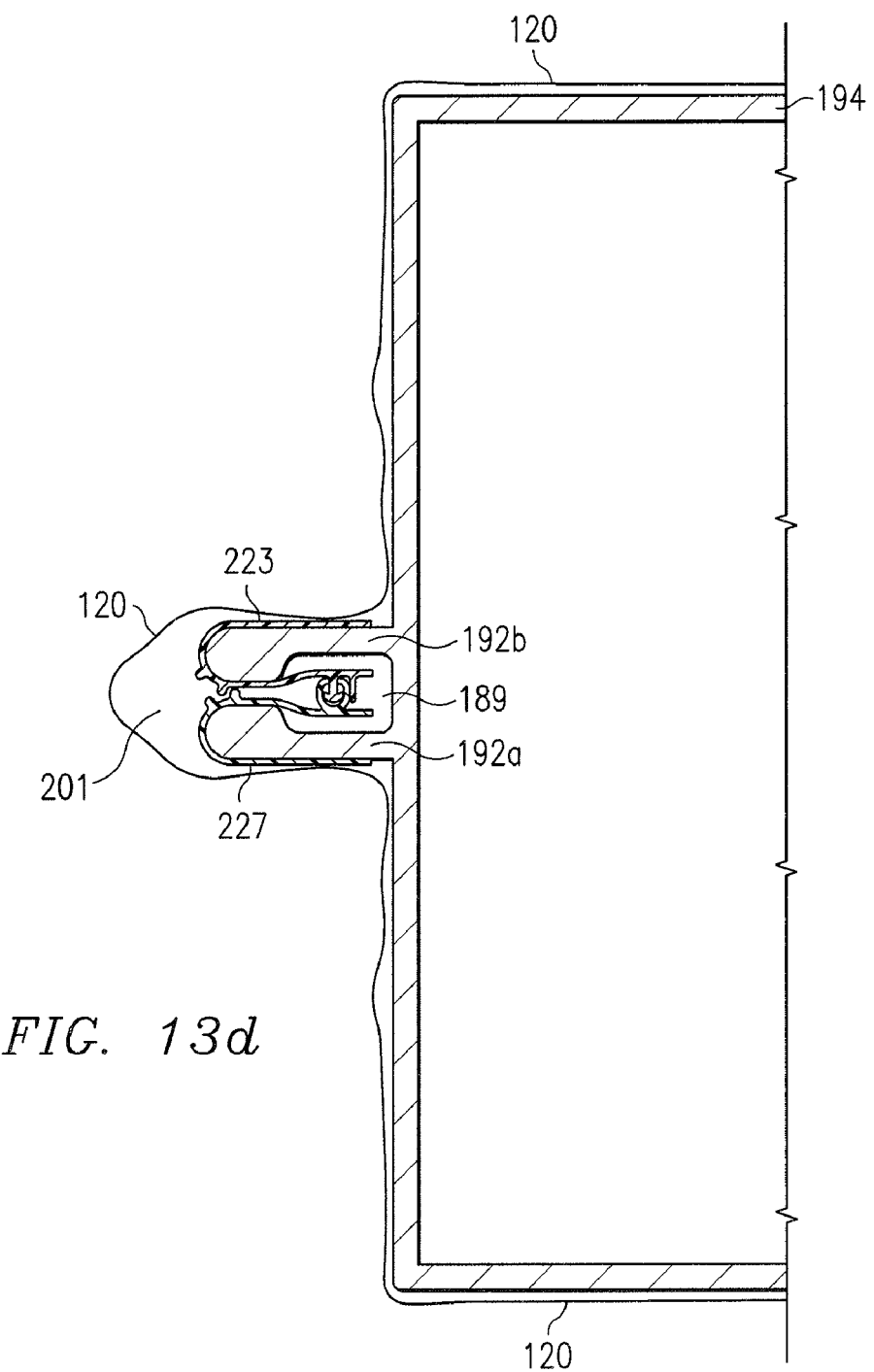
FIG. 13d is a simplified sectional view of the transition tension mechanism, said sectional view taken along lines 13d—13d of FIG. 13c.

Referring now to FIGS. 11, 13c, and 13d, the module 194 also includes a tension insertion mechanism 202 comprising two projecting plates 192a, 192b situated on opposing sides of a module channel track 189. When the module 194 is attached to the bottom of the forming tube 191, the module channel track 189 connects with and is co-aligned with the channel track 188 formed in the forming tube 191. In accordance with the present invention, as the formed tube advances over the forming plates 204 and the tension insertion mechanism 202, tension is applied such that the associated tab portions 223, 227 of the zipper seal mechanism 220 are projected away from the surface of the forming tube 191 and bent around the two projecting plates 192a, 192b of the tension insertion mechanism 202 thereby blousing the packaging film 120 between the two portions of the associated tab portions 223, 227 sealed to the inner layer 110 of the formed tube. As particularly shown in FIG. 5d, this blousing creates a headspace 201 between the film 120 and the interlocked profile portions 224, 228 of the zipper seal mechanism 220. The creation of the headspace 201 improves the sealing qualities of the traverse seal subsequently applied to the package.

The embodiment of this quick change module 194, as it relates particularly vertical stand-up pouches having a zipper seal incorporated therein, is illustrated by FIGS. 13a, 13b, 13c and 13d. FIG. 13a is a perspective view in elevation of the zipper seal insertion quick change module 194 suspended below the bottom of a forming tube 191 shown partially cut away in order to illustrate interior features. FIG. 13b is a sectional view of the same embodiment of said quick change module 194 shown attached to the bottom of the forming tube 191. The sectional view of FIG. 13b is taken along reference lines 13b—13b of FIG. 13a. FIG. 13c is a side view in elevation of the tension insertion mechanism 202 incorporated into the quick change module 194. The sectional view of FIG. 13d is taken along reference lines 13d—13d of FIG. 13c.

With reference to FIGS. 11, 13a, 13b, and 13c, it can be seen that the embodiment illustrated shows that the quick change module 194 comprises one pair of forming plates 204 and a tension insertion mechanism 202, which must perform the same functions as similar elements described previously with relation to the vertical stand-up pouch. The module 194 is attached to the bottom of a forming tube 191, as will be described below.

The module 194 for the embodiment shown, attaches to the bottom of the forming tube 191 by first inserting one or more tabs 196 that are integral to the forming tube into corresponding holes 193 that are integral to the module 194. The module 194 is thereafter secured by placing another tab 195 that is integral with a diverter plate 261 into a tab guide 197 that is integral with a diverter tongue 263. As is evident from FIG. 13b, this diverter tongue 263 rotates about a pin 268 that extends through a collar 266. When the diverter tongue 263 is rotated in the direction of the arrow illustrated in FIG. 13b, the tab guide 197 slides along the tab 195. The tab guide 197 is biased in the opposite direction of the rotation indicated by the arrow in FIG. 13b by a spring 270. Pressure is maintained on the inside area of the forming tube 191 in the vicinity of the tabs 196 by virtue of one or more tongues 264 that fit on the inside opposite wall of the forming tube 191. Consequently, once the module 194 is properly installed on the base of the forming plate 191, the tabs 196 retain their position in their respective holes 193. Likewise, the diverter plate tab 195 retains its position in the tab guide 197.

As with the previous embodiments of the invention described above, the module embodiment illustrated also incorporates a diverter 261. The diverter is used in combination with the diverter tongue 263 o keep product away from the vertical gusset areas. This diverter 261 can likewise be used as a gas flushing channel in addition to serving the purpose of keeping product away from the gussets formed by the forming plates 204, as previously described.

The vertical form, fill, and seal machine having the a quick change module 194 of the present invention shown in FIG. 11, thereafter operates basically as previously described in the prior art, with the sealing jaws 108 forming a lower transverse seal, product being introduced through the forming tube 191 into the sealed tube of packaging film (which now has a crease on one side and a zipper seal on another side), and the upper transverse seal being formed, thereby completing the package.

The major differences between a prior art package and this embodiment of Applicants' package, however, are that a crease is formed on one side (which later becomes the bottom of the formed package) using the fixed mechanism described, a length zipper seal mechanism 220 in sealed onto the inner layer 110 of another side (which later becomes the top of the formed package) using the channel track 188 and fixed tension insertion mechanism 202 described, and that the graphics on the packaging film used by the invention are oriented such that when the formed package is stood onto the end with the crease, the graphics are readable by a consumer.

The quick change modules described herein, used in combination with the ability to move the tucker bar 106 away from the packaging film tube, as described with relation to FIGS. 6a, 6b, 6c and 11, and the use of the tension screw 162, allows for the conversion of a vertical form, fill, and seal machine from a standard pillow pouch configuration to a vertical stand-up pouch configuration (or flat bottom bag configuration), or to a configuration for producing stand-up packages having a zipper seal incorporated therein, and back again in a matter of minutes with several simple steps. Yet, the invention described does not require the addition of any parts that move during bag manufacture. Consequently, the invention is an improvement over the prior art in providing a simple, efficient, and effective modification to a vertical form, fill, and seal machine, that allows the operator to manufacture a standard pillow pouch bag, vertical stand-up pouch, flat bottom bag, or stand-up packages having a zipper seal incorporated therein with an easy change over and few collateral maintenance issues.

While the invention has been particularly shown and described with reference to a preferred embodiment, it will be understood by those skilled in the art that various changes in form and detail may be made and other adaptations and modifications can be employed therein without departing from the spirit and scope of the invention.

The invention claimed is:

1. A vertical form, fill, and seal machine for manufacturing a flexible reclosable stand-up package having a zipper seal incorporated therein, comprising:
   a) a forming tube having an entrance portion and an exit portion;
   b) a device for dispensing a supply of zipper seal mechanism toward said form, fill, and seal machine, said zipper seal mechanism having first and second interlocking opposing members, wherein said first and second members each include a profile portion which interlocks with a complementary profile portion on said opposing member and a tab portion extending away from said profile portion;
   c) a channel formed in a surface of said forming tube and extending along the longitudinal axis of said forming tube from the entrance portion to the exit portion, wherein said channel is proportioned to receive the interlocked profile portions of said zipper seal mechanism;
   d) a roller mechanism for splaying the first and second tab portions away from one other so as lie adjacent to an exterior surface of said forming tube;
   e) a first heat seal mechanism for sealing a portion of each of the tab portions an to an adjacent surface of a thermoplastic film;
   f) a former mechanism for forming said thermoplastic sheet into a tubular shape about said forming tube and said zipper seal mechanism;
   g) a second heat seal mechanism for forming a back seal on said tubular shape of thermoplastic film thereby creating a film tube downstream of said first heat seal mechanism;
   h) an apparatus for imparting a crease in said film tube;
   i) an apparatus for forming a space between an inner surface of said film tube and said interlocked profile portions of said zipper seal mechanism prior to traversely sealing said tube; and
   j) a pair of heat sealing jaws for imparting a traverse seal on said film tube downstream from said creasing apparatus, wherein said sealing jaws include a cutting mechanism for severing said package from said tube.

2. The vertical form, fill, and seal machine of claim 1, wherein said crease imparting apparatus comprises an adjustable, stationary tucker bar capable of being positioned between a first pair of forming plates.

3. The vertical form, fill, and seal machine of claim 1, wherein the space forming apparatus comprises a second pair of forming plates situated on opposing sides of said channel formed in a surface of said forming tube, wherein each of said second pair of forming plates includes a first edge, which is parallel to said longitudinal axis of said forming tube, and a second edge which projects away from said longitudinal axis of said forming tube.

4. A method of making flexible reclosable containers from a sheet of thermoplastic film having two lateral edges on a form, fill, and seal machine comprising the steps of:
   a) dispensing a length of zipper seal mechanism having first and second interlocking opposing members, wherein said first and second members each include a profile portion which interlocks with a complementary profile portion on said opposing member and a tab portion extending away from said profile portion;
   b) feeding said interlocking profile portions of said zipper seal mechanism longitudinally along a longitudinal channel formed in a surface of a forming tube of said form, fill, and seal machine;
   c) splaying said tab portions away from each other so as to lie adjacent said forming tube surface;
   d) feeding a continuous supply of said film toward said forming tube;
   e) wrapping said sheet of film longitudinally about said forming tube surface and said zipper seal mechanism forming a film tube having said lateral edges overlapping each other;
   f) sealing a portion of each said tab portions to an adjacent surface of said film tube;
   g) subsequent to step f), sealing said two lateral edges in a longitudinal back seal;
   h) forming a vertical crease in said film tube prior to sealing said film tube traversely;
   i) forming a space between said portion of each said tab portions sealed to said adjacent surface of said film tube, and said inner surface of said film tube disposed therebetween, prior to traversely sealing said tube;
   j) forming a first traverse seal on said film tube, wherein said first traverse seal includes a portion of said vertical crease and a portion of said zipper seal mechanism, said first traverse seal sealing all layers of said tube and said crease together, and sealing all layers of said film tube and said zipper seal mechanism together;
   k) dropping a product into a partially formed package created by steps a) through j);
   l) forming a second traverse seal on said film tube, wherein said second traverse seal includes a portion of said vertical crease and a portion of said zipper seal mechanism, said second traverse seal sealing all layers of said tube and said crease together, and sealing all layers of said film tube and said zipper seal mechanism together; and m) cutting said tube at said second traverse seal, thus forming a flexible stand-up package having a zipper seal mechanism sealed along an interior edge.

5. The method of claim 4, wherein said sheet of thermoplastic film has lettering oriented perpendicular to a direction of travel of said sheet of film.

6. The method of claim 4, wherein the crease of step h) is formed by at least one adjustable, stationary tucker bar positioned between a pair of forming plates.

7. The method of claim 6, wherein said tucker bar comprises a fluoropolymer.

8. The method of claim 4, wherein the space of step i) is formed by guiding the interlocked profile portions of said zipper seal mechanism in a direction parallel to said forming tube while projecting the tab portions of said zipper seal mechanism away from said forming tube.

* * * * *